United States Patent
Daly et al.

(10) Patent No.: US 11,677,851 B2
(45) Date of Patent: *Jun. 13, 2023

(54) ACCELERATED NETWORK PACKET PROCESSING

(71) Applicant: Intel Corporation, Santa Clara, CA (US)

(72) Inventors: Daniel Daly, Ann Arbor, MI (US); John Fastabend, Hillsboro, OR (US); Matthew Vick, Hillsboro, OR (US); Brian J. Skerry, Gilbert, AZ (US); Marco Varlese, Dublin (IE); Jing Mark Chen, Shanghai (CN); Danny Y. Zhou, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/484,004

(22) Filed: Sep. 24, 2021

(65) Prior Publication Data

US 2022/0060555 A1 Feb. 24, 2022

Related U.S. Application Data

(63) Continuation of application No. 16/460,798, filed on Jul. 2, 2019, now Pat. No. 11,134,132, which is a (Continued)

(51) Int. Cl.
*H04L 67/561* (2022.01)
*H04L 69/22* (2022.01)
(Continued)

(52) U.S. Cl.
CPC ............ *H04L 67/561* (2022.05); *H04L 49/70* (2013.01); *H04L 69/22* (2013.01); *H04L 69/324* (2013.01)

(58) Field of Classification Search
CPC ..... H04L 45/028; H04L 45/22; H04L 45/125; H04L 29/08; H04L 12/931; H04L 29/06
See application file for complete search history.

(56) References Cited

U.S. PATENT DOCUMENTS

| 5,243,596 A | 9/1993 | Port et al. |
| 5,642,483 A | 6/1997 | Topper |

(Continued)

FOREIGN PATENT DOCUMENTS

| CN | 1589551 | 3/2005 |
| CN | 101352012 | 1/2009 |

(Continued)

OTHER PUBLICATIONS

Notice of Allowance for Chinese Patent Application No. 201680075637.4, dated Apr. 1, 2022.

(Continued)

*Primary Examiner* — Iqbal Zaidi
(74) *Attorney, Agent, or Firm* — Essential Patents Group, LLP; Christopher K. Gagne

(57) ABSTRACT

Devices and techniques for accelerated packet processing are described herein. The device can match an action to a portion of a network data packet and accelerate the packet-processing pipeline for the network data packet through the machine by processing the action.

19 Claims, 5 Drawing Sheets

Related U.S. Application Data continuation of application No. 15/878,966, filed on Jan. 24, 2018, now Pat. No. 10,432,745, which is a continuation of application No. 14/977,810, filed on Dec. 22, 2015, now Pat. No. 9,912,774.

(51) Int. Cl.
*H04L 69/324* (2022.01)
*H04L 49/00* (2022.01)

(56) References Cited

U.S. PATENT DOCUMENTS

| | | |
|---|---|---|
| 5,784,003 A | 7/1998 | Dahlgren |
| 6,157,955 A | 12/2000 | Narad et al. |
| 6,442,172 B1 | 8/2002 | Wallner et al. |
| 6,453,360 B1 | 9/2002 | Muller et al. |
| 6,735,679 B1 | 5/2004 | Herbst et al. |
| 6,836,483 B1 | 12/2004 | Lee |
| 6,948,099 B1 | 9/2005 | Tallam |
| 6,976,149 B1 | 12/2005 | Brandt et al. |
| 6,980,552 B1 | 12/2005 | Belz et al. |
| 7,042,888 B2 | 5/2006 | Berggreen |
| 7,046,685 B1 | 5/2006 | Matsuoka et al. |
| 7,062,571 B1 | 6/2006 | Dale et al. |
| 7,177,276 B1 | 2/2007 | Epps et al. |
| 7,203,740 B1 | 4/2007 | Putzolu et al. |
| 7,389,462 B1 * | 6/2008 | Wang .............. H04L 1/188 714/748 |
| 7,492,714 B1 | 2/2009 | Liao et al. |
| 7,499,941 B2 | 3/2009 | Michaeli et al. |
| 7,539,777 B1 | 5/2009 | Aitken |
| 7,633,880 B2 | 12/2009 | Bang et al. |
| 7,643,486 B2 | 1/2010 | Belz et al. |
| 7,826,470 B1 | 11/2010 | Aloni et al. |
| 7,872,774 B2 | 1/2011 | Okamoto |
| 7,873,959 B2 | 1/2011 | Zhu et al. |
| 7,889,750 B1 | 2/2011 | Parker |
| 7,904,642 B1 | 3/2011 | Gupta et al. |
| 7,961,734 B2 | 6/2011 | Panwar et al. |
| 8,077,611 B2 | 12/2011 | Bettink et al. |
| 8,094,659 B1 | 1/2012 | Arad |
| 8,155,135 B2 | 4/2012 | Aloni et al. |
| 8,514,855 B1 | 8/2013 | Robertson et al. |
| 8,527,613 B2 | 9/2013 | Malone et al. |
| 8,593,955 B2 | 11/2013 | Yano et al. |
| 8,638,793 B1 | 1/2014 | Ben-Mayor et al. |
| 8,693,374 B1 | 4/2014 | Murphy et al. |
| 8,738,860 B1 | 5/2014 | Griffin et al. |
| 8,788,512 B2 | 7/2014 | Asaad et al. |
| 8,798,047 B1 | 8/2014 | Wadekar et al. |
| 8,971,338 B2 | 3/2015 | Mishra et al. |
| 9,049,153 B2 | 6/2015 | Casado et al. |
| 9,049,271 B1 | 6/2015 | Hobbs et al. |
| 9,055,004 B2 | 6/2015 | Edsall et al. |
| 9,055,114 B1 | 6/2015 | Talaski et al. |
| 9,112,818 B1 | 8/2015 | Arad et al. |
| 9,124,644 B2 | 9/2015 | Patel et al. |
| 9,213,537 B2 | 12/2015 | Bandakka et al. |
| 9,258,224 B2 | 2/2016 | Bosshart et al. |
| 9,276,846 B2 | 3/2016 | Goyal et al. |
| 9,294,386 B2 | 3/2016 | Narad |
| 9,298,446 B2 | 3/2016 | Chang et al. |
| 9,450,817 B1 | 9/2016 | Bahadur et al. |
| 9,467,363 B2 | 10/2016 | Gao |
| 9,544,231 B2 | 1/2017 | Bosshart et al. |
| 9,590,925 B2 | 3/2017 | Yamashita |
| 9,686,209 B1 | 6/2017 | Arad et al. |
| 9,692,690 B2 | 6/2017 | Joshi et al. |
| 9,712,439 B2 | 7/2017 | Bosshart et al. |
| 9,755,932 B1 | 9/2017 | Godbole et al. |
| 9,825,862 B2 | 11/2017 | Bosshart |
| 9,826,071 B2 | 11/2017 | Bosshart |
| 9,838,268 B1 | 12/2017 | Mattson |
| 9,888,033 B1 | 2/2018 | Li et al. |
| 9,891,898 B1 | 2/2018 | Tonsing |
| 9,912,610 B2 | 3/2018 | Bosshart et al. |
| 9,912,774 B2 | 3/2018 | Daly et al. |
| 9,923,816 B2 | 3/2018 | Kim et al. |
| 9,960,956 B1 | 5/2018 | Johnson et al. |
| 10,009,276 B2 | 6/2018 | Bosshart et al. |
| 10,015,048 B2 | 7/2018 | Gasparakis et al. |
| 10,044,646 B1 | 8/2018 | Detwiler |
| 10,091,137 B2 | 10/2018 | Tran et al. |
| 10,135,734 B1 | 11/2018 | Singh et al. |
| 10,225,381 B1 | 3/2019 | Bosshart |
| 10,291,555 B2 | 5/2019 | K et al. |
| 10,341,242 B2 | 7/2019 | Srinivasan et al. |
| 10,361,914 B2 | 7/2019 | Gasparakis et al. |
| 10,412,018 B1 | 9/2019 | Feng et al. |
| 10,419,242 B1 | 9/2019 | Tonsing et al. |
| 10,419,366 B1 | 9/2019 | Kim et al. |
| 10,432,527 B1 | 10/2019 | Bosshart |
| 10,686,735 B1 | 6/2020 | Watson |
| 10,892,939 B2 | 1/2021 | Castaldelli et al. |
| 2001/0043611 A1 | 11/2001 | Kadambi et al. |
| 2002/0001356 A1 | 1/2002 | Shenoi |
| 2002/0136163 A1 | 9/2002 | Kawakami et al. |
| 2002/0172210 A1 | 11/2002 | Wolrich et al. |
| 2003/0009466 A1 | 1/2003 | Ta et al. |
| 2003/0043825 A1 | 3/2003 | Magnussen et al. |
| 2003/0046414 A1 | 3/2003 | Pettyjohn et al. |
| 2003/0046429 A1 | 3/2003 | Sonksen |
| 2003/0063345 A1 | 4/2003 | Fossum et al. |
| 2003/0107996 A1 | 6/2003 | Black et al. |
| 2003/0118022 A1 | 6/2003 | Kulkarni et al. |
| 2003/0147401 A1 | 8/2003 | Kyronaho et al. |
| 2003/0154358 A1 | 8/2003 | Seong et al. |
| 2003/0167373 A1 | 9/2003 | Winters et al. |
| 2003/0219026 A1 | 11/2003 | Sun et al. |
| 2004/0024894 A1 | 2/2004 | Osman et al. |
| 2004/0031029 A1 | 2/2004 | Lee et al. |
| 2004/0042477 A1 | 3/2004 | Bitar et al. |
| 2004/0105384 A1 | 6/2004 | Gallezot et al. |
| 2004/0123220 A1 | 6/2004 | Johnson et al. |
| 2004/0165588 A1 | 8/2004 | Pandya |
| 2004/0213156 A1 | 10/2004 | Smallwood et al. |
| 2005/0013251 A1 | 1/2005 | Wang et al. |
| 2005/0041590 A1 | 2/2005 | Olakangil et al. |
| 2005/0060428 A1 | 3/2005 | Corl et al. |
| 2005/0078651 A1 | 4/2005 | Lee et al. |
| 2005/0086353 A1 | 4/2005 | Shirakawa et al. |
| 2005/0108518 A1 | 5/2005 | Pandya |
| 2005/0120173 A1 | 6/2005 | Minowa |
| 2005/0129059 A1 | 6/2005 | Jiang et al. |
| 2005/0135399 A1 | 6/2005 | Baden et al. |
| 2005/0149823 A1 | 7/2005 | Lee |
| 2005/0198531 A1 | 9/2005 | Kaniz et al. |
| 2005/0243852 A1 | 11/2005 | Bitar et al. |
| 2006/0002386 A1 | 1/2006 | Yik et al. |
| 2006/0039374 A1 | 2/2006 | Belz et al. |
| 2006/0050690 A1 | 3/2006 | Epps et al. |
| 2006/0072480 A1 | 4/2006 | Deval et al. |
| 2006/0092857 A1 | 5/2006 | Ansari et al. |
| 2006/0114895 A1 | 6/2006 | Anand et al. |
| 2006/0114914 A1 | 6/2006 | Anand et al. |
| 2006/0117126 A1 | 6/2006 | Leung et al. |
| 2006/0174242 A1 | 8/2006 | Zhu et al. |
| 2006/0277346 A1 | 12/2006 | Doak et al. |
| 2007/0008985 A1 | 1/2007 | Lakshmanamurthy et al. |
| 2007/0050426 A1 | 3/2007 | Dubal et al. |
| 2007/0055664 A1 | 3/2007 | Michaeli et al. |
| 2007/0104102 A1 | 5/2007 | Opsasnick |
| 2007/0104211 A1 | 5/2007 | Opsasnick |
| 2007/0153796 A1 | 7/2007 | Kesavan et al. |
| 2007/0195761 A1 | 8/2007 | Tatar et al. |
| 2007/0195773 A1 | 8/2007 | Tatar et al. |
| 2007/0208876 A1 | 9/2007 | Davis |
| 2007/0230493 A1 | 10/2007 | Dravida et al. |
| 2007/0236734 A1 | 10/2007 | Okamoto |
| 2007/0280277 A1 | 12/2007 | Lund et al. |
| 2008/0082792 A1 | 4/2008 | Vincent et al. |
| 2008/0130670 A1 | 6/2008 | Kim et al. |
| 2008/0144662 A1 | 6/2008 | Marcondes et al. |
| 2008/0175449 A1 | 7/2008 | Fang et al. |

(56) References Cited

U.S. PATENT DOCUMENTS

| | | |
|---|---|---|
| 2008/0285571 A1 | 11/2008 | Arulambalam et al. |
| 2009/0006605 A1 | 1/2009 | Chen et al. |
| 2009/0096797 A1 | 4/2009 | Du et al. |
| 2009/0106523 A1 | 4/2009 | Steiss |
| 2009/0147787 A1 | 6/2009 | Arulambalam et al. |
| 2009/0180475 A1 | 7/2009 | Hashimoto |
| 2010/0085891 A1 | 4/2010 | Kind et al. |
| 2010/0128735 A1 | 5/2010 | Lipschutz |
| 2010/0135158 A1 | 6/2010 | Adams |
| 2010/0140364 A1 | 6/2010 | Nordberg et al. |
| 2010/0145475 A1 | 6/2010 | Bartels et al. |
| 2010/0150164 A1 | 6/2010 | Ma |
| 2010/0182920 A1 | 7/2010 | Matsuoka |
| 2010/0191951 A1 | 7/2010 | Malone et al. |
| 2010/0228733 A1 | 9/2010 | Harrison et al. |
| 2010/0238812 A1 | 9/2010 | Boutros et al. |
| 2010/0312941 A1 | 12/2010 | Aloni et al. |
| 2011/0149960 A1 | 6/2011 | Gutierrez |
| 2012/0033550 A1 | 2/2012 | Yano et al. |
| 2012/0159235 A1 | 6/2012 | Suganthi et al. |
| 2012/0170585 A1 | 7/2012 | Mehra et al. |
| 2012/0173661 A1 | 7/2012 | Mahaffey et al. |
| 2012/0177047 A1 | 7/2012 | Roitshtein |
| 2012/0284438 A1 | 11/2012 | Zievers |
| 2013/0003556 A1 | 1/2013 | Boden et al. |
| 2013/0028265 A1 | 1/2013 | Ronchetti et al. |
| 2013/0100951 A1 | 4/2013 | Ishizuka |
| 2013/0108264 A1 | 5/2013 | Deruijter et al. |
| 2013/0124491 A1 | 5/2013 | Pepper et al. |
| 2013/0163426 A1 | 6/2013 | Beliveau et al. |
| 2013/0163427 A1 | 6/2013 | Beliveau et al. |
| 2013/0163475 A1 | 6/2013 | Beliveau et al. |
| 2013/0166703 A1 | 6/2013 | Hammer et al. |
| 2013/0227051 A1 | 8/2013 | Khakpour et al. |
| 2013/0227519 A1 | 8/2013 | Maleport |
| 2013/0290622 A1 | 10/2013 | Dey et al. |
| 2013/0315054 A1 | 11/2013 | Shamis et al. |
| 2013/0318107 A1 | 11/2013 | Asaad et al. |
| 2013/0346814 A1 | 12/2013 | Zadigian et al. |
| 2014/0033489 A1 | 2/2014 | Kawashima |
| 2014/0040527 A1 | 2/2014 | Kanigicheria et al. |
| 2014/0043974 A1 | 2/2014 | Kwan et al. |
| 2014/0082302 A1 | 3/2014 | Rommelmann et al. |
| 2014/0115571 A1 | 4/2014 | Wang et al. |
| 2014/0115666 A1 | 4/2014 | Garcia Morchon et al. |
| 2014/0140342 A1 | 5/2014 | Narad |
| 2014/0181232 A1 | 6/2014 | Manula et al. |
| 2014/0181818 A1 | 6/2014 | Vincent et al. |
| 2014/0204943 A1 | 7/2014 | Palmer |
| 2014/0233568 A1 | 8/2014 | Dong |
| 2014/0241358 A1 | 8/2014 | Bosshart et al. |
| 2014/0241359 A1 | 8/2014 | Bosshart et al. |
| 2014/0241361 A1 | 8/2014 | Bosshart et al. |
| 2014/0241362 A1 | 8/2014 | Bosshart et al. |
| 2014/0244966 A1 | 8/2014 | Bosshart et al. |
| 2014/0269432 A1 | 9/2014 | Goyal et al. |
| 2014/0301192 A1 | 10/2014 | Lee et al. |
| 2014/0321473 A1 | 10/2014 | Chen et al. |
| 2014/0321476 A1 | 10/2014 | Yu et al. |
| 2014/0328180 A1 | 11/2014 | Kim et al. |
| 2014/0328344 A1 | 11/2014 | Bosshart |
| 2014/0334489 A1 | 11/2014 | Bosshart et al. |
| 2015/0003259 A1 | 1/2015 | Gao |
| 2015/0009796 A1 | 1/2015 | Koponen et al. |
| 2015/0010000 A1 | 1/2015 | Zhang et al. |
| 2015/0020060 A1 | 1/2015 | Bandakka et al. |
| 2015/0023147 A1 | 1/2015 | Lee et al. |
| 2015/0043589 A1 | 2/2015 | Han et al. |
| 2015/0081833 A1 | 3/2015 | Pettit et al. |
| 2015/0092539 A1 | 4/2015 | Sivabalan et al. |
| 2015/0109913 A1 | 4/2015 | Yamashita |
| 2015/0110114 A1 | 4/2015 | Wohlgemuth et al. |
| 2015/0121355 A1 | 4/2015 | Chang et al. |
| 2015/0131666 A1 | 5/2015 | Kang et al. |
| 2015/0131667 A1 | 5/2015 | Ko et al. |
| 2015/0142932 A1 | 5/2015 | Hallivuori et al. |
| 2015/0142991 A1 | 5/2015 | Zaloom |
| 2015/0146527 A1 | 5/2015 | Kishore et al. |
| 2015/0156288 A1 | 6/2015 | Lu et al. |
| 2015/0172198 A1 | 6/2015 | Levy et al. |
| 2015/0178395 A1 | 6/2015 | Tiwari et al. |
| 2015/0180769 A1 | 6/2015 | Wang et al. |
| 2015/0194215 A1 | 7/2015 | Douglas et al. |
| 2015/0195206 A1 | 7/2015 | Memon et al. |
| 2015/0222560 A1 | 8/2015 | Kakadia et al. |
| 2015/0249572 A1 | 9/2015 | Mack-Crane et al. |
| 2015/0256465 A1 | 9/2015 | Mack-Crane et al. |
| 2015/0271011 A1 | 9/2015 | Neginhal et al. |
| 2015/0281125 A1 | 10/2015 | Koponen et al. |
| 2015/0319086 A1 | 11/2015 | Tripathi et al. |
| 2015/0363522 A1 | 12/2015 | Maurya |
| 2015/0381418 A1 | 12/2015 | Fausak et al. |
| 2015/0381495 A1 | 12/2015 | Cherian et al. |
| 2016/0006654 A1 | 1/2016 | Fernando et al. |
| 2016/0014073 A1 | 1/2016 | Reddy et al. |
| 2016/0019161 A1 | 1/2016 | Patel et al. |
| 2016/0094460 A1 | 3/2016 | Shelar et al. |
| 2016/0139892 A1 | 5/2016 | Atreya et al. |
| 2016/0149784 A1 | 5/2016 | Zhang et al. |
| 2016/0156557 A1 | 6/2016 | Bosshart et al. |
| 2016/0173371 A1 | 6/2016 | Bays |
| 2016/0173383 A1 | 6/2016 | Liu et al. |
| 2016/0188313 A1 | 6/2016 | Dubal et al. |
| 2016/0188320 A1 | 6/2016 | Chang et al. |
| 2016/0191306 A1 | 6/2016 | Gasparakis et al. |
| 2016/0191361 A1 | 6/2016 | Behera et al. |
| 2016/0191370 A1 | 6/2016 | Wood |
| 2016/0191384 A1 | 6/2016 | Shelar et al. |
| 2016/0191406 A1 | 6/2016 | Xiao et al. |
| 2016/0197852 A1 | 7/2016 | Hutchison et al. |
| 2016/0212012 A1 | 7/2016 | Young et al. |
| 2016/0232019 A1 | 8/2016 | Shah et al. |
| 2016/0234067 A1 | 8/2016 | Dolganow et al. |
| 2016/0234097 A1 | 8/2016 | Chang |
| 2016/0234102 A1 | 8/2016 | Kotalwar et al. |
| 2016/0234103 A1 | 8/2016 | Kotalwar et al. |
| 2016/0241459 A1 | 8/2016 | Zheng et al. |
| 2016/0301601 A1 | 10/2016 | Anand et al. |
| 2016/0315866 A1 | 10/2016 | Thapar et al. |
| 2016/0323243 A1 | 11/2016 | Levasseur et al. |
| 2016/0330127 A1 | 11/2016 | Kim et al. |
| 2016/0330128 A1 | 11/2016 | Wang |
| 2016/0337329 A1 | 11/2016 | Sood et al. |
| 2016/0342510 A1 | 11/2016 | Pani |
| 2016/0344629 A1 | 11/2016 | Gray |
| 2016/0357534 A1 | 12/2016 | Krishnamoorthi et al. |
| 2016/0359685 A1 | 12/2016 | Yadav et al. |
| 2017/0005951 A1 | 1/2017 | Labonte et al. |
| 2017/0013452 A1 | 1/2017 | Mentze et al. |
| 2017/0019302 A1 | 1/2017 | Lapiotis et al. |
| 2017/0019329 A1 | 1/2017 | Kozat et al. |
| 2017/0034082 A1 | 2/2017 | Pfaff |
| 2017/0041209 A1 | 2/2017 | Joshi et al. |
| 2017/0048144 A1 | 2/2017 | Liu |
| 2017/0053012 A1 | 2/2017 | Levy et al. |
| 2017/0063690 A1 | 3/2017 | Bosshart |
| 2017/0064047 A1 | 3/2017 | Bosshart |
| 2017/0070416 A1 | 3/2017 | Narayanan et al. |
| 2017/0075692 A1 | 3/2017 | Naresh et al. |
| 2017/0085414 A1 | 3/2017 | Castaldelli et al. |
| 2017/0085477 A1 | 3/2017 | Li et al. |
| 2017/0085479 A1 | 3/2017 | Wang et al. |
| 2017/0091258 A1 | 3/2017 | Rajahalme |
| 2017/0093707 A1 | 3/2017 | Kim et al. |
| 2017/0093986 A1 | 3/2017 | Kim et al. |
| 2017/0093987 A1 | 3/2017 | Kaushalram et al. |
| 2017/0111275 A1 | 4/2017 | Li et al. |
| 2017/0118041 A1 | 4/2017 | Bhattacharya et al. |
| 2017/0118042 A1 | 4/2017 | Bhattacharya et al. |
| 2017/0126588 A1 | 5/2017 | Anand et al. |
| 2017/0134282 A1 | 5/2017 | Agarwal et al. |
| 2017/0134310 A1 | 5/2017 | Koladi et al. |
| 2017/0142000 A1 | 5/2017 | Cai et al. |
| 2017/0142011 A1 | 5/2017 | Zhang et al. |

(56) References Cited

U.S. PATENT DOCUMENTS

| | | | |
|---|---|---|---|
| 2017/0149632 A1 | 5/2017 | Saltsidis et al. |
| 2017/0180273 A1 | 6/2017 | Daly et al. |
| 2017/0195229 A1 | 7/2017 | Ulas et al. |
| 2017/0208015 A1 | 7/2017 | Volkening et al. |
| 2017/0220499 A1 | 8/2017 | Gray |
| 2017/0222881 A1 | 8/2017 | Holbrook et al. |
| 2017/0223575 A1 | 8/2017 | Duda et al. |
| 2017/0251077 A1 | 8/2017 | Eerpini et al. |
| 2017/0264571 A1 | 9/2017 | Aibester et al. |
| 2017/0289034 A1 | 10/2017 | Bosshart et al. |
| 2018/0006945 A1 | 1/2018 | Flajslik et al. |
| 2018/0006950 A1 | 1/2018 | Flajslik et al. |
| 2018/0054385 A1 | 2/2018 | Dharmapurikar et al. |
| 2018/0103060 A1 | 4/2018 | Li et al. |
| 2018/0115478 A1 | 4/2018 | Kim et al. |
| 2018/0124183 A1 | 5/2018 | Kozat et al. |
| 2018/0191640 A1 | 7/2018 | Calderon et al. |
| 2018/0234340 A1 | 8/2018 | Kim et al. |
| 2018/0234355 A1 | 8/2018 | Kim et al. |
| 2018/0262424 A1 | 9/2018 | Roeland et al. |
| 2018/0287819 A1 | 10/2018 | Mayer-Wolf et al. |
| 2018/0316549 A1 | 11/2018 | Gasparakis et al. |
| 2018/0375755 A1 | 12/2018 | Joshi et al. |
| 2019/0394086 A1 | 12/2019 | Gasparakis et al. |
| 2020/0007473 A1 | 1/2020 | Kim et al. |
| 2020/0021486 A1 | 1/2020 | Gasparakis et al. |
| 2020/0076737 A1 | 3/2020 | Bosshart |
| 2020/0084093 A1 | 3/2020 | Gasparakis et al. |
| 2020/0099617 A1 | 3/2020 | Bosshart |
| 2020/0099618 A1 | 3/2020 | Bosshart |
| 2020/0099619 A1 | 3/2020 | Bosshart |
| 2020/0228433 A1 | 7/2020 | Lee |
| 2020/0244576 A1 | 7/2020 | Wetterwald et al. |
| 2020/0280428 A1 | 9/2020 | Kovacs et al. |
| 2020/0280518 A1 | 9/2020 | Lee et al. |
| 2022/0091992 A1 | 3/2022 | Shanbhogue et al. |

FOREIGN PATENT DOCUMENTS

| | | |
|---|---|---|
| EP | 3229424 | 10/2017 |
| JP | 2015080175 | 4/2015 |
| JP | 6127900 | 5/2017 |
| WO | 2013101024 | 7/2013 |
| WO | 2017112165 | 6/2017 |

OTHER PUBLICATIONS

Notice of Allowance for U.S. Appl. No. 16/519,873, dated Mar. 17, 2022.
Notice of Allowance for U.S. Appl. No. 16/582,798, dated Mar. 22, 2022.
Notice of Allowance for U.S. Appl. No. 16/687,271, dated Mar. 22, 2022.
Notice of Allowance for U.S. Appl. No. 16/519,873, dated Dec. 3, 2021.
Notice of Allowance for U.S. Appl. No. 16/582,798, dated Dec. 1, 2021.
Notice of Allowance for U.S. Appl. No. 16/687,271, dated Dec. 1, 2021.
Office Action and English Translation of Office Action for Chinese Patent Application No. 201680075637.4, dated Jan. 5, 2022.
Advisory Action for U.S. Appl. No. 15/835,238, dated Nov. 22, 2019, 3 pages.
Advisory Action for U.S. Appl. No. 15/888,054, dated Feb. 10, 2020.
Final Office Action for U.S. Appl. No. 15/784,191, dated Feb. 26, 2021.
Final Office Action for U.S. Appl. No. 15/784,191, dated May 7, 2020, 13 pages.
Final Office Action for U.S. Appl. No. 15/784,192, dated Jun. 1, 2020, 14 pages.
Final Office Action for U.S. Appl. No. 15/888,050, dated Dec. 12, 2019.
Final Office Action for U.S. Appl. No. 15/888,054, dated Sep. 18, 2019.
International Preliminary Report on Patentability for PCT Application No. PCT/US2016/062511, dated Jun. 26, 2018.
International Search Report and Written Opinion for PCT Application No. PCT/US2016/062511, dated Feb. 28, 2017.
Non-Final Office Action for U.S. Appl. No. 16/569,554, dated Feb. 19, 2021.
Notice of Allowance for U.S. Appl. No. 14/583,664, dated Feb. 28, 2018.
Notice of Allowance for U.S. Appl. No. 14/836,850, dated Jun. 20, 2017.
Notice of Allowance for U.S. Appl. No. 14/836,855, dated Jun. 30, 2017.
Notice of Allowance for U.S. Appl. No. 14/977,810, dated Oct. 20, 2017.
Notice of Allowance for U.S. Appl. No. 15/678,549, dated Apr. 8, 2020.
Notice of Allowance for U.S. Appl. No. 15/678,549, dated Dec. 27, 2019.
Notice of Allowance for U.S. Appl. No. 15/678,556, dated Feb. 4, 2020.
Notice of Allowance for U.S. Appl. No. 15/729,555, dated May 2, 2019.
Notice of Allowance for U.S. Appl. No. 15/729,593, dated Nov. 15, 2018.
Notice of Allowance for U.S. Appl. No. 15/784,190, dated May 10, 2019, 20 pages.
Notice of Allowance for U.S. Appl. No. 15/784,191, dated Apr. 19, 2019, 7 pages.
Notice of Allowance for U.S. Appl. No. 15/784,191, dated Aug. 21, 2019, 8 pages.
Notice of Allowance for U.S. Appl. No. 15/784,191, dated Aug. 31, 2021.
Notice of Allowance for U.S. Appl. No. 15/784,191, dated May 5, 2021.
Notice of Allowance for U.S. Appl. No. 15/784,192, dated Mar. 17, 2021.
Notice of Allowance for U.S. Appl. No. 15/784,192, dated Jun. 30, 2021.
Notice of Allowance for U.S. Appl. No. 15/784,192, dated Sep. 30, 2021.
Notice of Allowance for U.S. Appl. No. 15/835,233, dated Jul. 3, 2019, 8 pages.
Notice of Allowance for U.S. Appl. No. 15/835,233, dated Oct. 29, 2019.
Notice of Allowance for U.S. Appl. No. 15/835,235, dated Apr. 24, 2020.
Notice of Allowance for U.S. Appl. No. 15/835,235, dated Aug. 20, 2019, 16 pages.
Notice of Allowance for U.S. Appl. No. 15/835,238, dated Sep. 30, 2020.
Notice of Allowance for U.S. Appl. No. 15/835,239, dated Nov. 13, 2019, 10 pages.
Notice of Allowance for U.S. Appl. No. 15/835,242, dated Jun. 24, 2020.
Notice of Allowance for U.S. Appl. No. 15/835,242, dated Jul. 1, 2019, 7 pages.
Notice of Allowance for U.S. Appl. No. 15/835,249, dated Jul. 25, 2019.
Notice of Allowance for U.S. Appl. No. 15/835,250, dated Jul. 25, 2019, 17 pages.
Notice of Allowance for U.S. Appl. No. 15/878,966, dated May 15, 2019.
Notice of Allowance for U.S. Appl. No. 16/026,318, dated Mar. 12, 2019.
Notice of Allowance for U.S. Appl. No. 16/460,798, dated May 27, 2021.
Notice of Allowance for U.S. Appl. No. 16/519,873, dated Aug. 30, 2021.

(56) References Cited

OTHER PUBLICATIONS

Notice of Allowance for U.S. Appl. No. 16/582,798, dated Aug. 27, 2021.
Notice of Allowance for U.S. Appl. No. 16/687,271, dated Aug. 30, 2021.
Notice of Allowance for U.S. Appl. No. 16/789,339, dated Jul. 29, 2021.
Translation of Office Action for Chinese Patent Application No. 201680075637.4, dated Mar. 2, 2021.
Translation of Office Action for Chinese Patent Application No. 201680075637.4, dated Sep. 23, 2021.
Office Action for U.S. Appl. No. 15/878,966, dated Jan. 11, 2019.
Office Action for U.S. Appl. No. 14/583,664, dated Feb. 27, 2017.
Office Action for U.S. Appl. No. 14/583,664, dated Jul. 28, 2016.
Office Action for U.S. Appl. No. 14/583,664, dated Oct. 18, 2017.
Office Action for U.S. Appl. No. 14/863,961, dated Jun. 16, 2017.
Office Action for U.S. Appl. No. 14/864,032, dated Feb. 14, 2017.
Office Action for U.S. Appl. No. 14/977,810, dated Jun. 29, 2017.
Office Action for U.S. Appl. No. 15/678,549, dated Feb. 26, 2019.
Office Action for U.S. Appl. No. 15/678,549, dated Jul. 30, 2019.
Office Action for U.S. Appl. No. 15/678,556, dated Jun. 19, 2019.
Office Action for U.S. Appl. No. 15/678,565, dated Jun. 13, 2019.
Office Action for U.S. Appl. No. 15/729,593, dated Aug. 10, 2018.
Office Action for U.S. Appl. No. 15/784,191, dated Aug. 26, 2020, 14 pages.
Office Action for U.S. Appl. No. 15/784,191, dated Dec. 19, 2018, 11 pages.
Office Action for U.S. Appl. No. 15/784,191, dated Jan. 24, 2020, 12 pages.
Office Action for U.S. Appl. No. 15/784,192, dated Sep. 19, 2019, 14 pages.
Office Action for U.S. Appl. No. 15/835,233, dated Feb. 8, 2019, 17 pages.
Office Action for U.S. Appl. No. 15/835,235, dated Feb. 25, 2019, 24 pages.
Office Action for U.S. Appl. No. 15/835,238, dated Dec. 11, 2019.
Office Action for U.S. Appl. No. 15/835,238, dated Feb. 7, 2019.
Office Action for U.S. Appl. No. 15/835,238, dated Jun. 19, 2019.
Office Action for U.S. Appl. No. 15/835,238, dated Jun. 5, 2020.
Office Action for U.S. Appl. No. 15/835,239, dated Feb. 7, 2019, 20 pages.
Office Action for U.S. Appl. No. 15/835,239, dated Jun. 19, 2019, 18 pages.
Office Action for U.S. Appl. No. 15/835,242, dated Oct. 18, 2019, 8 pages.
Office Action for U.S. Appl. No. 15/835,247, dated Dec. 31, 2018, 18 pages.
Office Action for U.S. Appl. No. 15/835,247, dated Jul. 10, 2019.
Office Action for U.S. Appl. No. 15/835,249, dated Dec. 31, 2018.
Office Action for U.S. Appl. No. 15/835,250, dated Apr. 4, 2019, 16 pages.
Office Action for U.S. Appl. No. 15/835,393, dated Jan. 7, 2021.
Office Action for U.S. Appl. No. 15/888,050, dated Jun. 11, 2019.
Office Action for U.S. Appl. No. 15/888,054, dated Mar. 11, 2019.
Office Action for U.S. Appl. No. 16/026,318, dated Sep. 20, 2018.
Office Action for U.S. Appl. No. 16/288,074, dated Oct. 7, 2020.
Office Action for U.S. Appl. No. 16/288,074, dated Mar. 5, 2020.
Office Action for U.S. Appl. No. 16/4670,798, dated Nov. 18, 2020.
Office Action for U.S. Appl. No. 16/519,873, dated Jun. 11, 2021.
Office Action for U.S. Appl. No. 16/569,554, dated Aug. 18, 2020.
Office Action for U.S. Appl. No. 16/569,554, dated Jul. 2, 2021.
Office Action for U.S. Appl. No. 16/569,554, dated Sep. 27, 2021.
Office Action for U.S. Appl. No. 16/573,847 dated Jan. 6, 2021.
Office Action for U.S. Appl. No. 16/573,847, dated Aug. 2, 2021.
Office Action for U.S. Appl. No. 16/582,798, dated Jun. 24, 2021.
Office Action for U.S. Appl. No. 16/687,271, dated Jun. 24, 2021.
Office Action for U.S. Appl. No. 16/695,044, dated Jul. 8, 2021.
Office Action for U.S. Appl. No. 16/695,049, dated Jul. 21, 2021.
Office Action for U.S. Appl. No. 16/695,053 dated Aug. 4, 2021.
Office Action for U.S. Appl. No. 16/804,960, dated Aug. 19, 2021.

Office Action for U.S. Appl. No. 16/804,960, dated May 12, 2021.
"Selection of Cyclic Redundancy Code and Checksum Algorithms to Ensure Critical Data Integrity", Federal Aviation Administration William J. Hughes Technical Center Aviation Research Division Atlantic City International Airport New Jersey 08405, DOT/FAA/TC-14/49, Mar. 2015, 111 pages.
Arashloo, Mina Tahmasbi, et al., "SNAP: Stateful Network-Wide Abstractions for Packet Processing", SIGCOMM '16, Aug. 22-26, 2016, 27 pages, ACM, Florianopolis, Brazil.
Bosshart, P., et al., "Forwarding Metamorphosis: Fast Programmable Match-Action Processing in Hardware or SDN", SIGCOMM'13, Aug. 12-16, 2013, 12 pages, ACM, Hong Kong, China.
Kaufmann, A., et al., "High Performance Packet Processing with FlexNIC", ASPLOS'16, Apr. 2-6, 2016, 15 pages, ACM, Atlanta, GA, USA.
Moshref, Masoud, et al., "Flow-level State Transition as a New Switch Primitive for SON" HotSDN'14, Aug. 22, 2014, 6 pages, ACM, Chicago, IL, USA.
Sivaraman, A., et al., "Towards Programmable Packet Scheduling", HotNets'15, Nov. 16-17, 2015, 7 pages, ACM, Philadelphia, PA, USA.
Sivaraman, Anirudh, et al., "Packet Transactions: a Programming Model for Data-Plane Algorithms at Hardware Speed", arXiv:1512.05023v1, Dec. 16, 2015, 22 pages.
Sivaraman, Anirudh, et al., "Packet Transactions: High-level Programming for Line-Rate Switches", ?rXiv:1512.05023v2, Jan. 30, 2016, 16 pages.
Sivaraman, Anirudh, et al., "Packet Transactions: High-level Programming for Line-Rate Switches", SIGCOMM'16, Aug. 22-26, 2016, 14 pages, ACM, Florianopolis, Brazil.
Sivaraman, Anirudh, et al., "Programmable Packet Scheduling at Line Rate", SIGCOMM'16, Aug. 22-26, 2016, 14 pages, ACM, Florianopolis, Brazil.
Song, "Protocol-Oblivious Forwarding: Unleashe the Power of SDN through a Future-Proof Forwarding Plane", Huawei Technologies, USA, 6 pages.
Final Office Action for U.S. Appl. No. 16/695,044, dated Dec. 20, 2021.
Final Office Action for U.S. Appl. No. 16/804,960, dated Apr. 14, 2022.
Final Office Action for U.S. Appl. No. 17/134,110 dated Oct. 25, 2022.
Notice of Allowance for U.S. Appl. No. 15/835,247 dated Dec. 29, 2021.
Notice of Allowance for U.S. Appl. No. 15/835,247, dated Apr. 7, 2022.
Notice of Allowance for U.S. Appl. No. 15/835,247, dated Jul. 29, 2022.
Notice of Allowance for U.S. Appl. No. 16/573,847, dated Apr. 14, 2022.
Notice of Allowance for U.S. Appl. No. 16/573,847, dated Dec. 15, 2021.
Notice of Allowance for U.S. Appl. No. 16/695,044 dated Apr. 27, 2022.
Notice of Allowance for U.S. Appl. No. 16/695,049, dated Apr. 28, 2022.
Notice of Allowance for U.S. Appl. No. 16/695,049, dated Jan. 5, 2022.
Notice of Allowance for U.S. Appl. No. 16/879,704, dated Apr. 26, 2022.
Notice of Allowance for U.S. Appl. No. 17/318,890, dated Jun. 8, 2022.
Notice of Allowance for U.S. Appl. No. 17/318,890, dated Mar. 3, 2022.
Notice of Allowance for U.S. Appl. No. 17/867,508, dated Nov. 14, 2022.
Office Action for U.S. Appl. No. 16/569,554, dated Mar. 14, 2022.
Office Action for U.S. Appl. No. 16/695,053 dated Jan. 5, 2022.
Office Action for U.S. Appl. No. 16/695,053, dated May 11, 2022.
Office Action for U.S. Appl. No. 16/695,053, dated Oct. 14, 2022.
Office Action for U.S. Appl. No. 16/804,960, dated Dec. 13, 2021.

(56) References Cited

OTHER PUBLICATIONS

Office Action for U.S. Appl. No. 17/134,110, dated Dec. 22, 2022.
Office Action for U.S. Appl. No. 17/134,110, dated Jun. 24, 2022.
Office Action for U.S. Appl. No. 17/859,722, dated Oct. 26, 2022.

* cited by examiner

ACCELERATED NETWORK PACKET PROCESSING

CROSS-REFERENCE TO RELATED APPLICATIONS

This application is a continuation (and claims the benefit of priority under 35 U.S.C. § 120) of U.S. application Ser. No. 16/460,798, filed Jul. 2, 2019, and entitled ACCELERATED NETWORK PACKET PROCESSING, which application is a continuation (and claims the benefit of priority under 35 U.S.C. § 120) of U.S. application Ser. No. 15/878,966, filed Jan. 24, 2018, and entitled ACCELERATED NETWORK PACKET PROCESSING, which application is a continuation (and claims the benefit of priority under 35 U.S.C. § 120) of U.S. application Ser. No. 14/977,810, filed Dec. 22, 2015 and entitled ACCELERATED NETWORK PACKET PROCESSING. The disclosures of the prior Applications are considered part of and are hereby incorporated by reference in their entirety in the disclosure of this Application.

TECHNICAL FIELD

Embodiments described generally herein relate to processing of data packets sent or received through a network. Some embodiments relate to hardware acceleration of data packet processing.

BACKGROUND

Hardware switches when combined with specialized hardware functions provide network capabilities including packet switching, security, deep packet inspection, and other capabilities. Recently, there has been a trend in providing virtual switches and virtual functions executing on high-volume computer architectures. The industry has ongoing efforts focused on improving the coordination between the virtual switches for purposes of optimally taking advantage of the throughput benefits, provided by hardware switches along with the flexibility and power of virtual switches.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
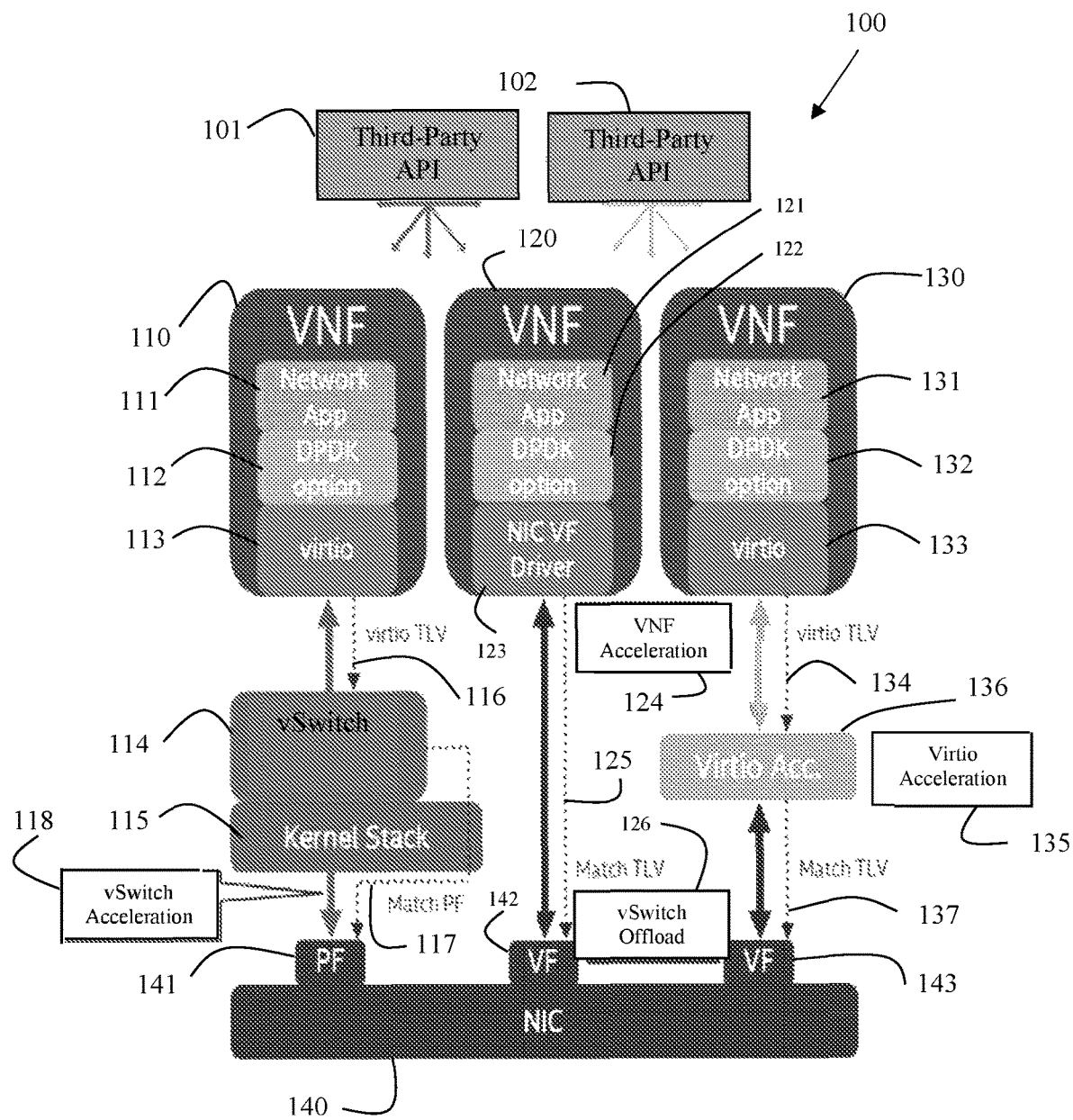
FIG. 1 illustrates components of a single system that deploys multiple switching platforms for implementing accelerated network packet processing in accordance with some embodiments.

Some network packet processing solutions have focused on hardware the use top-of-rack (ToR) switches and special function hardware to provide network functions including packet switching, security, deep packet inspection, and other functions. However, customers may experience reduced functionality caused by hardware limitations such as limited memory, limited Ternary Content-Addressable Memory (TCAM), reduced total number of supported data flows, etc. Furthermore, hardware switches may be overly rigid with respect to packet parsing, and hardware switches can exhibit a general lack of platform flexibility and configurability.

Therefore, the industry trend has been to provide software-defined networking (SDN) for decoupling network functions from underlying hardware, which can help increase agility and lower costs. Similarly, network function virtualization (NFV) can replace fixed-function hardware with implementations fully deployed in software that runs more cost-effectively on general purpose, standards-based servers, high-volume servers, and the like. However, such software-defined systems may not take advantage of some desirable characteristics of hardware switches.

These software-based solutions include a variety of software-based abstractions to the underlying physical architectures. For example, a virtual switch permits one or more Virtual Machines (VMs) to communicate with one another. A Virtual Network Function (VNF) may include one or more VMs (running different Operating Systems (OSs)) executing on one or more high volume hardware server architectures, hardware switches, hardware storage, and/or cloud infrastructures. VNFs process to provide specialized network processing in place of customized network appliances.

A variety of Application Programming Interfaces (APIs) and software platforms exist in the industry for permitting network automation utilizing virtual switches. A significant benefit of these approaches is the ability to define and customize packet processing rules and corresponding actions at the user-level of the Operating System (OS). One problem with these approaches is the underutilization of the underlying physical hardware switch, because a significant amount of rule matching and action identification for packet processing takes place within the kernel space of the OS and not on the underlying hardware switch, which has substantially better processing throughput.

One approach, associated with better utilization of the underlying switch architecture, is Single Root Input/Output (I/O) Virtualization (SR-IOV). With SR-IOV, an interface is provided that allows a device adapter to separate hardware resources among packet processing functions. However, this is a binary approach where the feature is: on or off. Moreover, SR-IOV activation alters the architecture's configuration and management. Consequently, SR-IOV is a packet processing "offload" solution, rather than a packet acceleration solution.

Embodiments provide a way to accelerate existing virtual switch solutions to better utilize the underlying physical switch hardware without changing or modifying how the existing virtual switch solutions interact with upper layers of device management and configuration.

Packet processing coordinates and manages, in a fine-grained fashion, multiple data plane components to utilize desirable features of both hardware switching and SDN/NFV usages. Control plane components include mechanisms to determine where traffic (e.g., data packets or flows) should be directed, while data plane components include mechanisms that forward traffic to those destinations. Embodiments provide control plane methods, systems, and devices to accelerate packet processing for multiple data plane components. Data plane components can include, by way of non-limiting example, Data Plane Development Kit (DPDK) components, field programmable gate array (FPGA) components, and Red Rock Canyon (RRC)/FM10K switch components available from Intel of Santa Clara, Calif., among other components. Methods in accordance with various embodiments can coordinate utilization of these and other components in a dynamic and flexible fashion based on user-defined and user-configured actions to reduce or minimize energy consumption or to enhance speed and performance. In embodiments, a control plane can offload a simple fast packet-processing pipeline from software-based switches or virtual switches to switch hardware, while providing for more-complicated processing on the CPU-based software data plane.

FIG. 1 illustrates components of a single system 100 that deploys multiple switching platforms for implementing methods in accordance with some embodiments. Illustration of the embodiments present just those components necessary for appreciating the depicted embodiments, such that other components are foreseeable without departing from the teachings herein.

The system 100 implements techniques having enhanced match-action acceleration in existing software-based packet processing pipelines (series of packet processing stages) for optimized increased bandwidth, lower latency and jitter, and lower Central Processing Unit (CPU) consumption. Match-action processing refers to a mechanism by which the system 100 enables packet processing acceleration. Match-action resources found in the system 100 execute this acceleration. Existing software-based control planes 101 and 102 (such as OpenStack, OpenDaylight, etc.) do not need modification in order to realize the acceleration presented herein. In addition, existing virtualization constructs (providing virtualized environment management), such as Virtio 113 and 133 do not need modified to use the architecture underlying the system 100, which include the optimizations for packet acceleration.

There are no additional interfaces or control planes, which a user is, required to learn in order to realize the optimizations presented herein with respect to accelerated packet processing/communication between devices (such as VMs managed by VNFs 110, 120, and 130).

Specifically, a Network Interface Controller (NIC) provides one or more novel physical functions (PF 141) and one or more virtual functions (VFs 142 and 143). These functions 141-143 respond to one or more novel match-action (e.g., P4) tables and cooperate with existing control planes 101 and 102 and their existing API commands for executing enhanced network packet processing between VNFs (110, 120, and 130) by offloading software-based match-action network packet processing to the underlying switch architecture of the NIC 140. The processing occurs below the operating system (OS) kernel stack 115 on the NIC 140 within TCAM, the PFs 141, and/or the VFs 142 and 143.

The functions 141-143 provide: 1) virtual switch (vSwitch) acceleration 118, 2) vSwitch offloading 126, 3) VNF acceleration 124, and 4) vitrio (virtualization (VM)) acceleration 135.

It is to be noted that although the system 100 depicts functions 141-143 supporting the four types of acceleration (118, 124, 126, and 135); this does not have to be the case in every instance. That is, in other embodiments, the NIC can implement one and/or configured for supporting, all, or various combinations of the four types of acceleration (118, 124, 126, and 135).

The functions (141, 142, and 143) and the supported four types of network packet acceleration (118, 124, 126, and 135) through match-action processing is as follows (with reference to the system 100 of the FIG. 1).

It is noted that the VNF 110 is programmed for processing (on the underlying hardware of the system 100) a variety of software, such as and by way of example, a network application 111 (performing one or more specialized network packet processing operations), a Data Plan Development Kit 122 (DPDK 122) API, and a virtualization service (virtio 113). The VNF 120 includes a network application 121, a DPDK API option 122, and a NIC VF Driver 123. The VNF 130 includes a network application 131, a DPDK API option 132, and a virtualization service (virtio 133).

The VNFs 110, 120, and 130 situated above the vSwitch 114. The vSwitch 114 situated above the kernel stack 115. Access by the vSwitch for matching and accessing the PF 141 over link 117. Access for accessing VF 142 by the NIC VF driver 123 of VNF 120 over link 125 (for direct TLV lookups through VF 142). Access for the VF 143 by the virtio instance 133 of VNF 130 over links 134 and 137 through 136 for virtio TLV driven lookups 134 and match TLV lookups 137 directly through the VF 143.

vSwitch Acceleration

By employing metadata generated in response to a match action table (e.g., P4 file(s)), acceleration of the packet-processing pipeline for the vSwitch 114 occurs.

A P4 file describes capabilities of the match-action pipeline. In an embodiment, the structure of the match-action table is a P4 file (defined by p4.org open source programming language and formats) is:

[Parser]-[Ingress Quality of Service (QoS)]-[Filtering]-[Tunnel/Network Address Translation (NAT)]-[Replication]-[Egress QoS]

In an embodiment, the parser is in P4 format as well. This also provides frame formats (packet payload formats) for matching.

Additionally, P4 provides the mechanism for defining the match filed. A non-limiting set of files can appear as follows:

| L1 | L2 | L3 | L4 | >L5 |
|---|---|---|---|---|
| Source Port | Destination Media Access Control (DMAC) | Source Internet Protocol (IP) (4/6) | Destination L4 | Virtual Network Index (VNI) |
| Source Virtual Port | Source Media Access Control (SMAC) | Destination IP (4/6) | Source L4 | Network Service Header (NSH) Path |
| | Ethernet | Protocol | Transmission Control Protocol (TCP) | NSH Service |
| | Outermost Virtual Local Area Network (VLAN) | | | L4 TCAM |
| | Second Outermost VLAN | | | |
| | Outermost Multiprotocol Label Switching (MPLS) | | | |
| | Second MPLS | | | |

The parse tree also recognizes a format for inner header tunnel-encapsulated frames:

| Inner Header | Inner L2 | Inner L3 | Inner L4 |
|---|---|---|---|
| VNI | DMAC SMAC Ethernet Outermost VLAN | Source IP (4/6) Destination IP (4/6) Protocol | Destination L4 Source L4 |

P4 also provides a mechanism for specifying the supported actions, as well as which tables support which actions. A non-limiting example set of actions can be as follows:

| Basic Actions | Modify Actions | Tunnel/NAT Actions | Replication |
|---|---|---|---|
| Count | Set VLAN/VPRI | Virtual Extensible Local Area Network (VXLAN) | Mirror |
| Permit/deny/drop | Push VLAN | Decapsulate VXLAN | Multicast |
| Forward to port | Pop VLAN | Encapsulate NSH | Sample |
| Forward to virtual port | Set Differentiated Service Code Point (DSCP) | Decapsulate NSH | |
| Spread across ports | route | | |
| | Set_soft_id | | | vSwitch Acceleration Using Metadata

The host Ethernet controller (e.g., NIC 140) processes received-received frames first on system 100, and then the host Ethernet controller passes the processed frames up into the various software layers of the system 100 for further additional processing. On the receive path, the Ethernet controller can pre-process the frames and associate with the frame additional metadata. The semantics of this pre-processing are match-action based. The following examples illustrate the processing by which the vSwitch 114 (such as Open vSwitch (OvS) 114) pipeline processing accelerates with embodiments presented herein.

TCAM Pre-Classify

The host controller pushes received packet frames into the TCAM in the pipeline. The vSwitch 114 programs a set of matching rules into the TCAM (using and existing API of the vSwitch 114, such as an API associated with OvS). This causes some amount of metadata being set that include the result of the TCAM lookup. The PF 141, upon matching, appends the result (extra metadata and either in an encapsulating VLAN or a soft_id_value) within the received frame. The software pipeline uses that result in the metadata embedded in the received frame and can avoid having to achieve this TCAM lookup within the software pipeline.

In an embodiment and in the case of OvS (114), an enhanced-patch to OvS 114 detects this added metadata in the packet. If the metadata does not exist in the packet header in the packet header, the OvS 114 pursues its normal processing path. However, the OvS 114 skips 117 its typical software-based TCAM lookup processing within its pipeline when the metadata exists in the packet header (an indication that the PF 141 previously appended the TCAM look results within the NIC 140 before the OvS 114 processes the packet).

Tunnel Decapsulation

The host controller 140 receives a frame, the vSwitch 114 programs rules that map outer VXLAN, VXLAN-Generic-Protocol-Extension (GPE)+NSH, Generic Network Virtualization Encapsulation (Geneve), or Network Virtualization using Generic Routing Extension (NVGRE) headers into the metadata. In an embodiment, The PF 141 processes these rules for: 1) matching the rules on outer header (L2, L3, VNI, and Service Header); 2) decapsulates the matched outer header, and 3) and adds some additional metadata for signaling the removed header. The pipeline processing detects the removed outer header and processes the inner header accordingly.

In the case of OvS 114 (vSwitch 114), the PF 141 uses the decapsulation processing in conjunction with TCAM pre-classify processing for providing metadata on the outer header as well as metadata on the rules matched in the TCAM. When used in conjunction, the TCAM pre-classify rules apply to the inner header.

vSwitch Tap

Tapping an interface can be used for monitoring packet processing by copying some or all of the frames (associated with the interface) and sending the frames to a different location. This unduly taxes the software and hardware resources of the system 100 and is intrusive to the vSwitch 114 processing. Therefore, the teachings presented herein are particularly beneficial in such a scenario. The system 100 achieves this copying using a match rule that maps in the match-action table to a mirror action, which the functions (141-143) process within the NIC 140.

In an embodiment, the vSwitch 114 sends the frames and then processes for multicast replication, tunnel encapsulation, and monitoring in the accelerated pipeline occurs after the frames occurs. In this manner, performance of packet acceleration takes place during transmit of the packets.

vSwitch Offload vSwitch offload 126 is an extension of vSwitch acceleration 118 when the following conditions are true of a given set of traffic (network packets being processed through the system 100):

1) the accelerated pipeline has a direct connection 125 to the VM (associated with the traffic managed within VNF 120); and 2) the accelerated pipeline has the capability to fully process the traffic with all of the same rules (which the vSwitch 114 data plane processes).

Although identified as an "offload," the rules within the vSwitch 114 never leave the vSwitch 114; here, the processing pushes and copies the rules into the accelerated pipeline, and pushes statistics for these rules back to the vSwitch 114 so that the rules stay in the software tables. A common configuration where vSwitch offload 126 can occur is when using OvS 114 to implement rules. The rules are applied by a separate control plane software layer; for example, OpenStack and OpenDaylight (e.g., Third Party APIs 101 and 102). The control flow is as follows:

1) A tunnel manager enumerates the virtual switches (multiple instances of vSwitch 114 not shown in the FIG. 1) and creates tunnels between them in a full mesh topology (every vSwitch connects to every other vSwitch). It is noted that in some embodiments, when vSwitches need to converse with one another, creation of the tunnels occur (lazy processing fashion).

2) When two VMs/containers want to connect to one another (from the VNFs 110-130), population of the forwarding rules to the VMs/containers respective vSwitches occurs. Certain systems will populate these rules via virtual L2 learning; other systems will provision the rules directly from a centralized controller.

In addition to tunnel rules (as discussed above), a vSwitch 114 can implement Access Control Lists (ACLs), service function classification, service function forwarding, basic ingress QoS, and connection tracking.

VNF Acceleration

In both vSwitch acceleration 118 and vSwitch offload 126, the vSwitch 114 is executing in the host system 100 and has full control of the underlying device associated with the system 100 for acceleration processing. Here, the connecting VM/container does not have any control over any sort of acceleration "from the network." The VM/container does not have any control over what happens inside the vSwitch 114. The VNF 120 uses the same semantics as the vSwitch 114 does for: discovering which tables are available, how many entries are available in each table, and what match-action rules for application. However, restriction of the VNF 120 occurs in the following manners:

1) The host system 100 trusts the VNF 120 for enabling the acceleration (otherwise, the host system 100 cannot honor requests from the VNF 120).

2) Application or the VNF's rules occur on traffic sent to or received from that VNF 120. Therefore, the focus in VNF acceleration 124 is on grooming traffic before sending that traffic to the VNF 120. Thus, the VNF 120 cannot add rules to affect traffic going to/from other VFs (such as VF 143), other PFs 141, or the physical uplink ports.

3) The VNF 120 does not have visibility beyond its own interface. Therefore, the VNF 120 cannot add rules affecting traffic going to/from other VNFs (110 and/or 130), PFs 141, VFs 141 and 143, or physical uplink ports.

4) The VNF 120 may not have the same sets of actions available to it. That is, the VNF functions are generally limited to functions related to the VNF 120, such as ACLs (drops, counts, and policing), steering packets to queues, prioritizing packets into queues, and marking packets with metadata for pre-processing.

In an embodiment, the VNF 120 has multiple queues associated with that VNF 120. The VNF 120 is programmed (using for example Data Plan Development Kit 122 (DPDK 122) API) in the following manner:

1) Configure a default Receive Site Scaling (RSS) rule to spread traffic across multiple queues. Here, the VNF 120 can associate a CPU core for each queue to scale the packet processing across multiple flows.

2) Configure a set of FlowDirector® (Intel® packet steering product) rules that work as exceptions to the RSS default-spreading rule, which places specific flow types and mega flows into specific flows or given specific priorities. When RSS cannot efficiently spread with RSS, the configuration of the FlowDirector® aids in handling that traffic. The configuration of the FlowDirector® also aids in handling high priority traffic.

3) Configure a set of filtering rules to drop or police traffic. This can protect the VNF 120 from unwanted traffic, or from receiving traffic at too high a rate.

4) In a manner similar to vSwitch acceleration 118, the VNF 120 can also associate a 16-bit software identifier (ID) on flows, based on match-action rules. This can accelerate certain forwarding paths within the VNF 120 (such as TCAM processing).

Virtio Acceleration

Virtio acceleration 135 is a variant of vSwitch offload 126 still requiring that the hardware of the system 100 be capable of fully forwarding and performing packet processing the frame, but there is no direct connection between the VNF 130/VM and the underlying hardware (134 and 137). Instead, the VNF 130 connects (via software) with a virtio driver 136. In this scenario, there is a software loop (this may be OvS with the DPDK netdev, or some other entity that is copying frames to/from the VF 143 and the virtio queues within the VF 130/VM. A presented scenario implementing OvS with the DPDK netdev is as follows.

Figure 2:
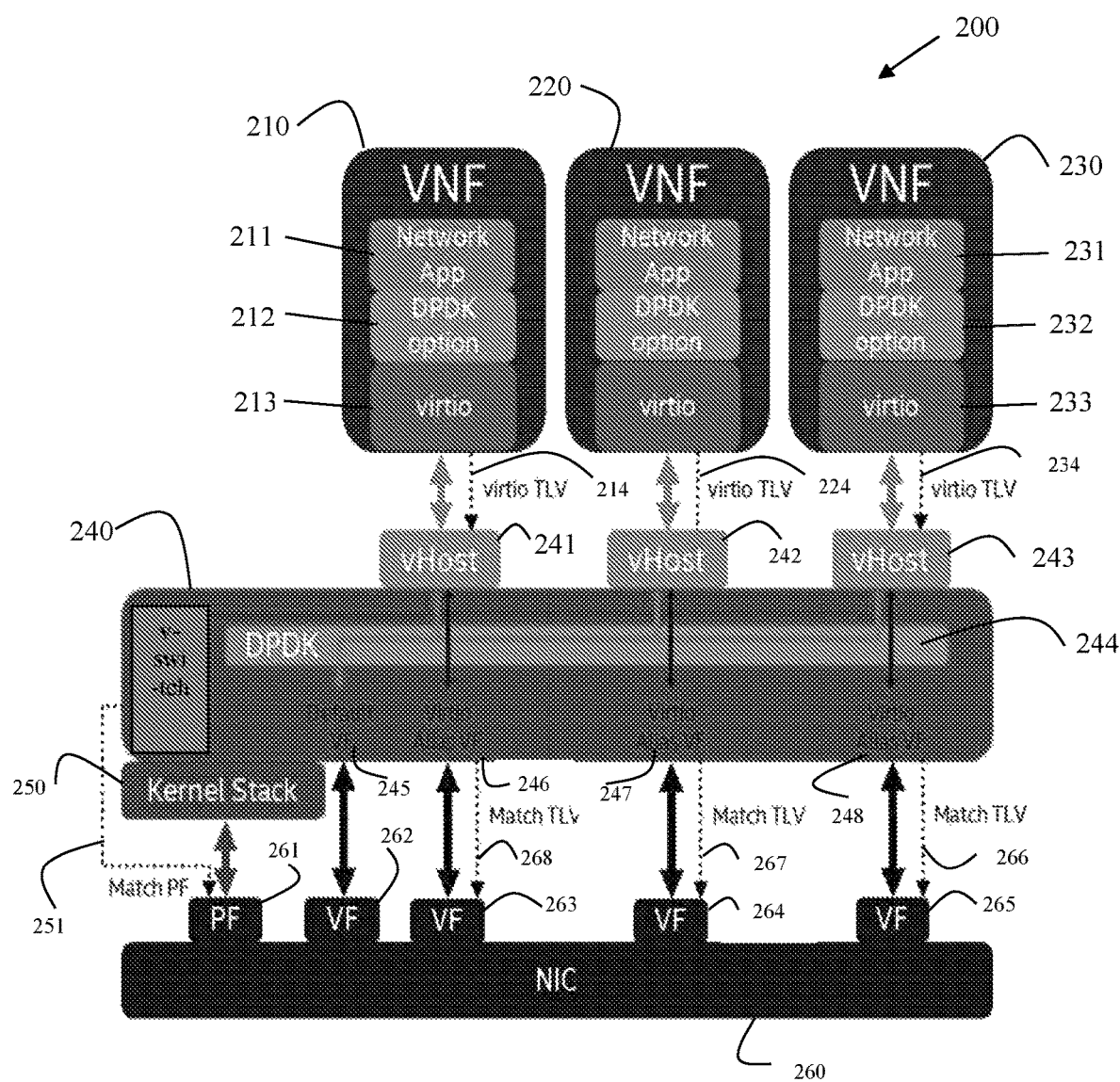
FIG. 2 illustrates components of a system that deploys a virtualization environment for implementing accelerated network packet processing in accordance with some embodiments.

Discussion of the virtio acceleration provided with reference to the FIG. 2.

Although embodiments of FIG. 2 are within the context of virtio that other embodiments are deployable utilizing any available virtualization management system.

FIG. 2 illustrates components of a system 200 that deploys a virtualization environment (such as virtio) for implementing accelerated inter-device communication in accordance with some embodiments. Illustration of the embodiments present just those components necessary for appreciating the depicted embodiments, such that other components are foreseeable without departing from the teachings herein.

Again, system 200 illustrates a number of VNFs (210, 220, and 230) each having a network application (211, 221, and 231), DPDK option APIs (212, 222, and 232), and an instance of virtio (virtualization management services —213, 223, and 233). Each virtio instance (214, 223, and 233) connected to a corresponding vHost (241, 242, and 243) having the ability for virtio TLV lookups via 214, 224, and 234.

The vHosts (241, 242, and 245) situated in the OS with a vSwitch 240 and service provided by DPDK 244. The kernel stack 250 situated in the OS under the vSwitch 240 and the DPDK 244. The kernel stack 250 having direct access to the PF 261 and the DPDK 244 and vSwitch 240 having direct access to the VFs 262-265. Match TLVs lookup configurations occur over 266-268. Link 251 providing operations offloaded to the PF 261. The PF 261 and the VFs 262-265 part of the NIC 260.

Underneath OvS, instantiation of N (number of) DPDK netdevs (Linux virtual unction netdevs-functions for obtaining state and capabilities) occurs. Each netdev corresponds to a VF (such as VFs 261 and 262) within the hardware. The arrangement of ports underneath OvS then appears as follows:

1) PFs accelerated ports attached as regular non-DPDK to the OvS kernel data path. Using these interfaces, when a flow requires processing by the kernel (requires TCP, IP tables, etc.).

2) Default Rule VF(s): between 0 and 4 VFs, hardware accessible for sending frames (which are incapable of forwarded a packet processed) to the DPDK user space pipeline for processing. These VFs (such as VFs 142 and 143) have a similar function as the PF 141 ports, except that the packet processing data plane is in the DPDK (with higher performance but without kernel stacks).

In an embodiment, if the underlying Red Rock Canyon (RRC) switch components available from Intel® of Santa Clara, Calif., can support 50 G of bandwidth with on VF (142 or 143) with additional assignment of bandwidth allocated by connecting multiple VFs (142 and 143) from different PFs 117 into one virtio queue.

3) Virtio Alias VFs: remaining VFs (142 or 143 or 261-265 of FIG. 2) used as virtio alias ports and are under the control of the DPDK user-space Poll Mode Driver (PMD).

When attachment of a new VNF 130/VM to the OvS occurs, allocation of this VF 130 occurs as a virtio alias VF. When this happens, the OvS with the DPDK netdev enables a set of "Hardware Offload Virtual (HOV)" paths between its virtual Host (vHost) implementation and the virtio alias VF. Installation of the software logic is as follows:

1) If all of the rules pertaining to the packets coming FROM this VNF 130/VM has been put into the hardware, then zero-copy directly from the vHost into the corresponding virtio alias VF.

2) Else if a partial set of rules pertaining to the packets coming FROM this VF 130/VM has been put into the hardware, process this frame through the OvS user-space pipeline, and when finished push the frame into the corresponding virtio alias VF.

3) Else pass the packet through the OvS packet-processing pipeline. The packet can be sent into the network either via the PF netdevs (the frames are directly forwarded out of a port), via the DPDK VF 130 (in which case the transmitting uplink chosen by the hardware that uses the embedded switch beneath it, or pushed into the kernel for processing via Kernel NIC Interface (KNIC).

4) In the other direction, all received packets on the virtio alias VFs are sent directly from the hardware into the software virtio queues (via vHost) on the HOV path (in an embodiment, a third-party application may provide a zero-copy implementation for doing this).

In the hardware, plumbing of the reverse path occurs and the processing looks similar:

1) If application of all of the rules pertaining to the packets coming TO this VF 130/VM occurred, then forwarding the frame to the VF 130 corresponding to this VM. The PMD picks up this frame and pushes the frame to the VM over the HOV path.

2) If application of a partial set of rules pertaining to this packet occurred, or if this packet misses in the hardware tables, forward the frame to the default rule VF for handling. These frames picked up by the PMD and processed in the DPDK user-space pipeline.

3) Optionally, specific flows needing kernel processing trapped to the PF 141 for standard kernel processing.

When programming the hardware, rules that split traffic between virtio alias, default user space, and kernel data paths preserve conversational ordering. That is one rule does not forward a particular 5-tuple (Destination IP, Source IP, L4-Destination, L4-Source, Protocol) via one path and then forward another frame with the same 5-tuple through another path.

The inverse processing used on the software side: the vHost arbitrates between frames coming directly from the virtio alias, DPDK user-space and kernel data paths. As these are already in conversational order, just process a scheduling function. The virtio alias has highest processing priority, followed by the DPDK user-space and then kernel path.

In this scenario, a VNF 130 may request acceleration by sending Tag-Length-Values (TLVs) via virtio. If this VNF 130 has an aliased VF, these TLVs converted into VNF acceleration requests over a VF mailbox. For this reason and in an embodiment, a configuration provides support for multi-queue virtio, since this allows the VNF 130 to enable RSS and FlowDirector® to spread traffic to multiple queues within the VM. For VNFs using multiple cores, this allows the hardware to spread traffic to multiple cores appearing the connection between VNF 130 and the VF 130 is a direct connection.

In a scenario in which the DPDK or kernel data paths completely process the traffic, the processing through system 100 occurs in two manners:

1) In-line: The first data path to process the frame (hardware packets from the network, software for packets from the vHost) can minimally process the frame and send it to the primary data plane (user space, kernel, or hardware). This is a very efficient mechanism for choosing between data paths, as it does not "bounce-back" frames between data paths, but it does necessitate some amount of processing by the first data path, which may be redundant or overhead on top of the primary data path doing the processing.

2) Bounce-Back: In this scenario software "fastpaths" frames into the hardware, which then loopbacks frames back to the DPDK or the kernel if it cannot handle the frame itself. This has a lower amount of software overhead, but utilizes extra Peripheral Component Internet express (PCIe) bandwidth when frames bounced-back from the hardware back into the software.

In an embodiment, the above-mentioned techniques implemented as methods, an apparatus, and a system for computing-device architectures for achieving accelerated inter-device communication or operations (such as inter-VM communication on-chip for a single device architecture). This provides acceleration for one, all, or combinations of: 1) vSwitch acceleration using metadata, 2) offloaded vSwitch for Virtio connected VMs, 3) offloaded vSwitch for NSH service chaining, and/or 4) Multi-Layer Traffic Pre-Classify (VNF acceleration and NSH service chaining.

These and other embodiments of accelerated inter-device communication presented below with reference to the FIGS. 3-5.

Figure 3:
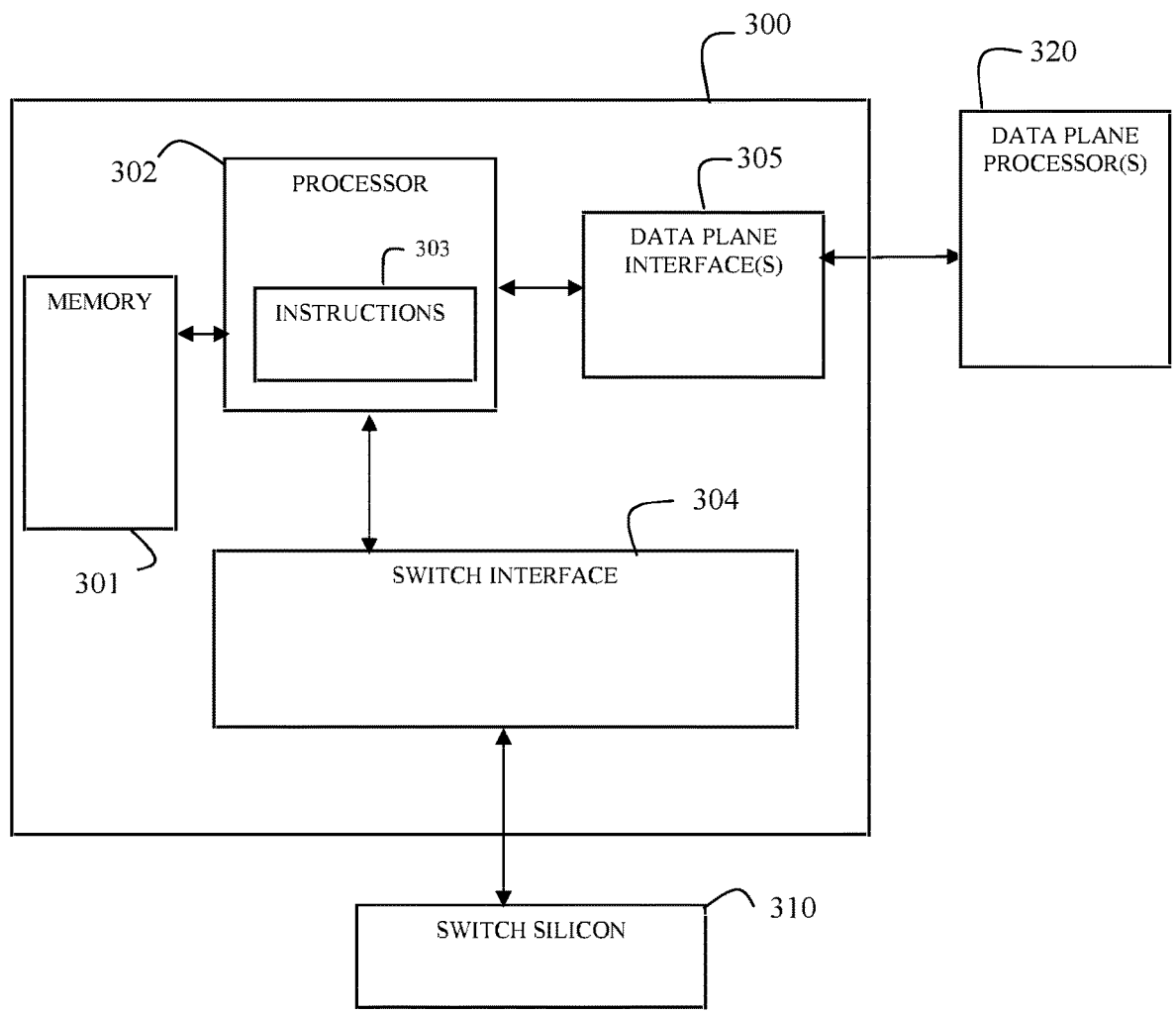
FIG. 3 illustrates a control device to accelerate network processing in accordance with some embodiments.

FIG. 3 illustrates a control device 300 to accelerate network processing in accordance with some embodiments. The control device 300 includes a memory 301, processor 302 having instructions 303, a switch interface 304, one or more data plane interfaces 305. The control device 300 interacts with switch silicon 310 (through the switch interface 304) and one or more data plane processor(s) 320 (through the data plane interface(s) 305).

In an embodiment, the control device 300 is a NIC.

In an embodiment, the control device 300 is the NIC 140 of the FIG. 1.

In an embodiment, the control device 300 is the NIC 260 of the FIG. 2

In an embodiment, the control device 300 integrated within and/or interfaced to a multi-core processor. In an embodiment, the multicore processor is a server.

In an embodiment, the control device 300 operates within multiple heterogeneous and virtualized processing environments having a variety of VMs, operating systems, etc.

The control device 300 includes processor 302 to perform functionalities as described herein. It will be understood that any or all of the functions performed by processor 302 can be executed with hardware, software, firmware, or any combination thereof, on one or more processing cores, for example Intel® Architecture cores 114 or a core of the control device 300.

In an embodiment, the processor 302 performs the processing described above with respect to the PF 141 and the VFs 142 and 143 of the FIG. 1.

In an embodiment, the processor 302 performs the processing described above with respect to the PF 261 and the VFs 262-265.

In embodiments, the processor 302 can match an action referenced from a table to a portion of data in a network packet. The processor 302.

In an embodiment, the processor 302 is at least partial programmed by an Application Programming Interface (API). In an embodiment, the API provided in formats supported by one or more of: DPDK, OvS, OpenDaylight, and OpenStack.

In an embodiment, the processor 302 is programmed to be responsive to one or more tables or files that identify actions that the processor 302 is responsive to for purposes of performing predefined processing based on a particular identified action.

In an embodiment, a user interface permits a user to access the API for populating the table or file with actions.

In an embodiment, the file or table is the match-action files discussed above with reference to the FIGS. 1-2.

The processor 302 can match an action reference from a file/table to a portion of a packet header for a received network packet. The processor 302 processes the action identified by the action reference in cooperation with the memory 301 to accelerate a packet-processing pipeline for the network packet.

In an embodiment, the memory 301 is Random Access Memory (RAM) on the control device 300.

Processing the action does not have to be a single operation; rather, the action can trigger the processor 302 to perform a series of predefined operations.

In an embodiment, the processor 302 when processing the action performs a Ternary CAM lookup on some of the packet data. This was discussed above in the FIGS. 1-2 and specific with relevance to acceleration using packet pre-classify processing performed at the NIC.

In an embodiment, the processor 302 when processing the actions decapsulates an outer tunnel encapsulated header for the network packet, removes that header, and adds metadata into the header indicating that the header was removed. This processing discussed above with reference to the FIG. 1.

In an embodiment, the processor 302 when processing the actions copies a packet payload (frame) from the network packet and then sends that copied payload to a network location, which is independent of network locations, defined within or identify resources for processing the packet-processing pipeline. This scenario describes network traffic mirror and monitor operations having substantial improvements in processing throughput since resolution, processing, and sending for mirror packets occur on the control device 300 and not at upper layers within the network architecture, such as the OS layer for a specific VM, and the like.

In an embodiment, the processor 302 when processing the action copies the network packet forwarding rules from a first virtual switch to a second virtual switch. This scenario discussed above with reference to vSwitch offload acceleration and the discussion of the FIG. 1.

The processor 302 configured to communicate with the underlying switch silicon 310 through a switch interface 304.

Figure 4:
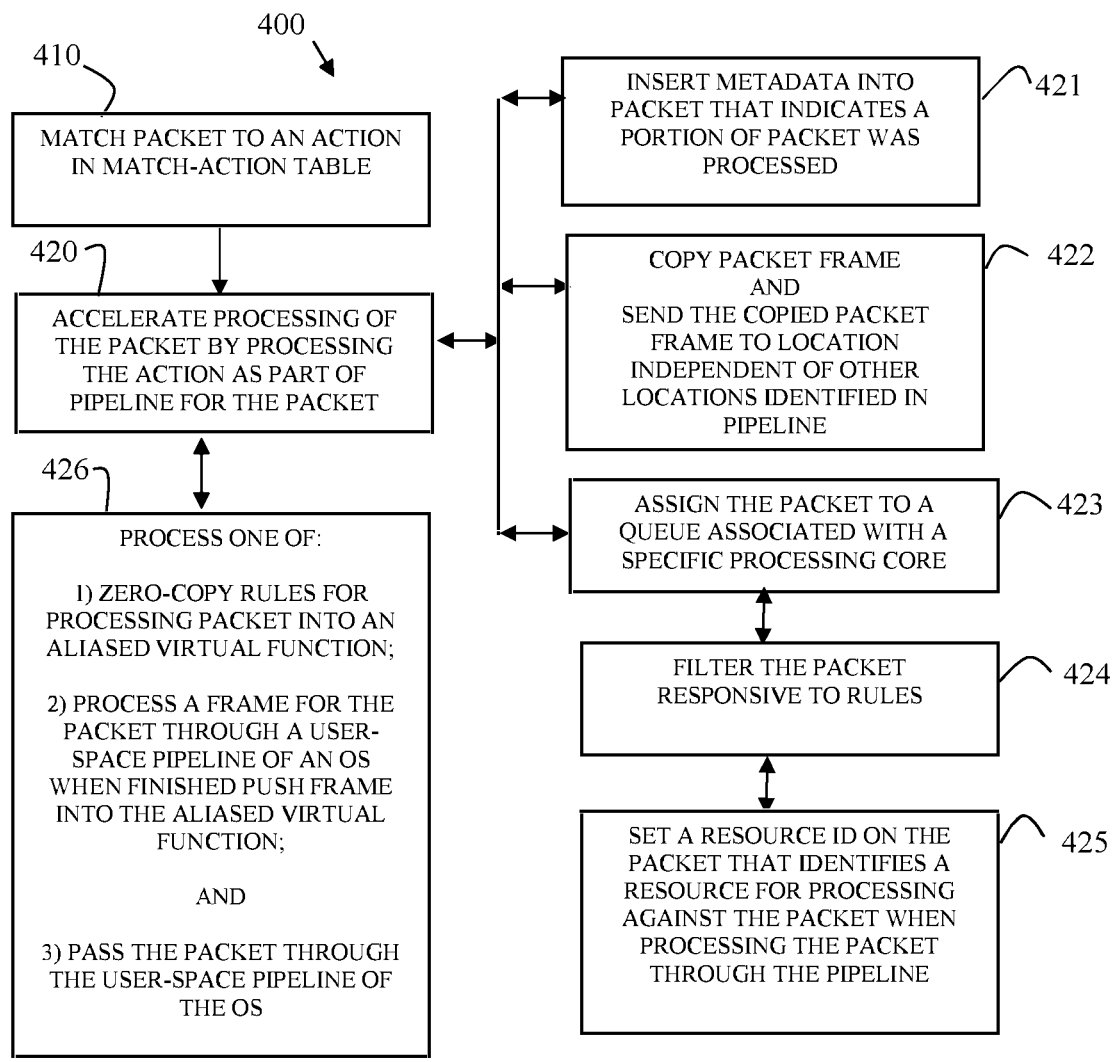
FIG. 4 illustrates a method for accelerating network packet processing in accordance with some embodiments.

FIG. 4 illustrates a method 400 for accelerating network packet processing in accordance with some embodiments. The method 400 implemented as executable instructions represented by one or more software modules (method 400 herein after referred to as "packet accelerator") and executed by one or more hardware processor(s) from a non-transitory computer-readable storage medium.

In an embodiment, the executable instructions representing the packet accelerator is stored in a non-transitory computer-readable storage medium that when executed by one or more computing devices performs the method 400 processing.

In an embodiment, the packet accelerator configured for execution as firmware on a NIC. In an embodiment, the packet accelerator is the PF 141 of the FIG. 1. In an embodiment, the packet accelerator is the VF(s) 142 and/or 143 of the FIG. 1. In an embodiment, the packet accelerator is the PF 261 of the FIG. 2. In an embodiment, the packet accelerator is the VF(s) 262-265 of the FIG. 2.

In an embodiment, the packet accelerator configured for execution within one or more virtual switches, one or more physical switches, one or more device interfaces, one or more virtual device interfaces, and/or one or more operating systems.

In an embodiment, the packet accelerator configured for execution within one or more independent and virtualized environments (execution on system 100 and/or system 200 of the FIGS. 1 and 2, respectively).

In an embodiment, the packet accelerator configured for execution as the control device 300 of the FIG. 3.

At 410, the packet accelerator matches a portion of a network data packet to an action in a match-action table. For example, the processing and file structures of match-action files and matching to network packets discussed in the FIG. 1 above.

At 420, the packet accelerator accelerates processing of the network packet through the machine by executing the action as part of a packet-processing pipeline for the network data packet. That is, action processing accelerates packet processing in a number of manners that can include processing for: 1) offloading processing of software-based resources to hardware-based resources; 2) reorganizing processing of the software-based resources; and/or 3) reorganizing how the software-based resources access the hardware-based resources.

According to an embodiment, at 421, the packet accelerator inserts metadata into the network data packet as an indication that a portion of the packet processing has been handled/processed when the action processed. For example, the pre-classify processing and the TCAM processing presented above in the FIGS. 1-2 provides discussion relevant this processing.

In an embodiment, at 422, the packet accelerator copies a packet frame for the network data packet and sends the copied packet frame to a location that is independent of locations associated with the packet-processing pipeline. This is a packet mirroring processing situation discussed above with reference to the FIG. 1.

In an embodiment, at 423, the packet accelerator assigns the network data packet to a queue associated with a specific processing core. This may entail other configuration dependencies and processing presented above with the discussion of the virtio acceleration processing of the FIG. 2.

In an embodiment of 423 and at 424, the packet accelerator filters the network packet responsive to filtering rules.

In an embodiment of 424 and at 425, the packet accelerator sets a resource identifier on the network data packet that identifies a resource for processing against the network data packet when processing the network data packet through the packet-processing pipeline. So, tables, metadata, and/or the packet-processing pipeline control structures providing a mechanism by which different heterogeneous software and/or hardware resources that assist in accelerating the network data packet through the packet-processing pipeline (network/device(s)), and these mechanisms identified as a resource identifier for the network data packet. The packet accelerator configured for identifying the resource identifier and causing the corresponding resource to process for accelerating the pipeline processing of the packet through the network/device(s).

In an embodiment, at 426, the packet accelerator performs a variety of alternative processing depending on whether traffic rules are fully offloaded to hardware or other conditions. Such conditions discussed with reference to the virtio acceleration of the FIG. 2. Thus, the packet accelerator can: 1) zero-copy rules for processing the network data packet into an aliased-virtualized function; 2) process a frame for the network data packet through a user-space of an OS and when finished push the frame into the aliased virtualized function; or 3) pass the network data packet through the user-space pipeline for the OS.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more processors of the control device 300 may be configured by firmware or software (e.g., instructions 303 (FIG. 3), an application portion, or an application) as a module that operates to perform specified operations. In an example, the software may reside on at least one machine-readable medium. In an example, the software, when executed by the underlying hardware of the module (e.g., the control device 300), can include instructions 303 (FIG. 3) to cause the hardware to perform the specified operations.

The term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. The terms "application, process, or service," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the terms "application, process, or service" may be used to refer to an embodiment of software or to hardware arranged to perform at least part of any operation described herein.

While a machine-readable medium may include a single medium, the term "machine-readable medium" may include a single medium or multiple media (e.g., a centralized or distributed database, and/or associated caches and servers).

The term "machine-readable medium" may include any medium that is capable of storing, encoding, or carrying instructions 303 for execution by a machine (e.g., the control device 300 or any other module) and that cause the machine to perform any one or more of the techniques of the present disclosure, or that is capable of storing, encoding or carrying data structures used by or associated with such instructions. In other words, the processor 302 (FIG. 3) can include instructions and can therefore be termed a machine-readable medium in the context of various embodiments. Other non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 303 may further be transmitted or received over a communications network using a transmission medium utilizing any one of a number of transfer protocols (e.g., frame relay, internet protocol (IP), TCP, user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1×* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

The term "transmission medium" shall be taken to include any intangible medium that is capable of storing, encoding or carrying instructions for execution by hardware processing circuitry, and includes digital or analog communications signals or other intangible medium to facilitate communication of such software.

Figure 5:
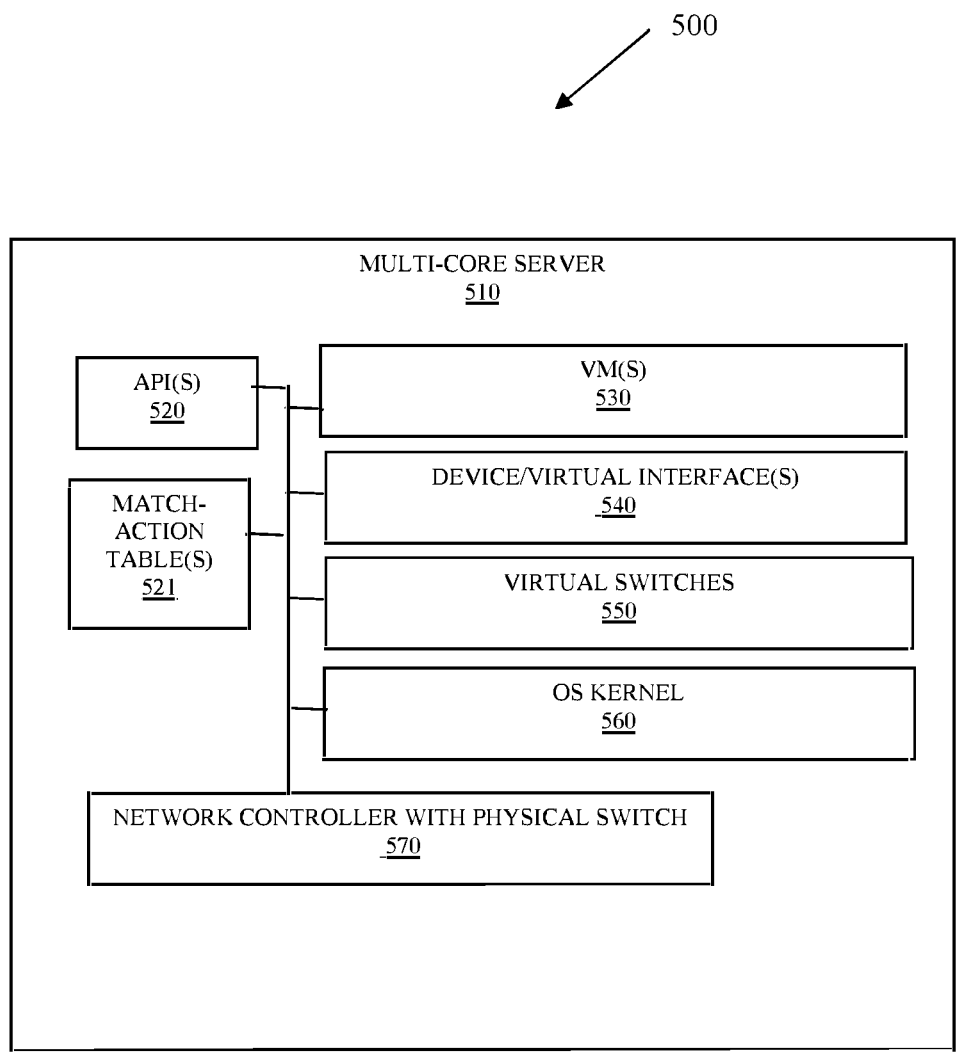
FIG. 5 illustrates a system for accelerating network packet processing in accordance with some embodiments.

FIG. 5 illustrates a system 500 for accelerating network packet processing in accordance with some embodiments. The system 500 shown in greatly simplified format with just particular components illustrated that are necessary for comprehending the system 500.

In an embodiment, the system is a multi-core server 510.

In an embodiment, the multi-core server 510 configured for performing vSwitch acceleration in the manners discussed above with reference to the FIG. 1.

In an embodiment, the multi-core server 510 configured for performing vSwitch offload acceleration in the manners discussed above with reference to the FIG. 1.

In an embodiment, the multi-core server 510 configured for performing VNF acceleration in the manners discussed above with reference to the FIG. 1.

In an embodiment, the multi-core server 510 configured for performing virtio acceleration in the manners discussed above with reference to the FIGS. 1 and/or 2.

In an embodiment, the multi-core server 510 configured for performing selective network packet acceleration for: vSwitch acceleration, vSwitch offload acceleration, VNF acceleration, and/or virtio acceleration in the manners discussed above with reference to the FIGS. 1 and/or 2.

The system 500 includes a means for matching a portion of a network packet to an action and a means for processing the action to accelerate a packet-processing pipeline, and, optionally, a means for configuring the means for matching and the means for processing.

The means for matching a portion of a network packet to an action during network-packet processing.

In an embodiment, the means for matching includes a match-action table 521 or file, such as a P4 file as discussed above with reference to the FIG. 1.

In an embodiment, the means for matching includes a memory, such as memory 301 of the FIG. 3.

In an embodiment, the means for matching includes volatile or non-volatile memory on a NIC, such as NIC 140 or 260 of the FIGS. 1 and 2, respectively.

In an embodiment, the means for matching includes volatile or non-volatile memory accessible on one or more devices representing the system 500.

In an embodiment, the means for matching includes a combination of memory and storage accessible on one or more device representing the system 500.

The means for processing configured to process the action (obtained from the means for matching). The action processed to accelerate a packet-processing pipeline (associated with or assigned to) for the network packet.

In an embodiment, the means for processing is one or more of: one or more device driver(s) (interface(s)) 540, one or more virtual interface(s) 540, one or more virtual switch (es) 550, one or more OS kernel processes (560), and/or a NIC with a physical switch 570.

In an embodiment, the means for processing is various combinations of the component devices and modules illustrated in the FIGS. 1, 2, and/or 3.

In an embodiment, the system 500 includes a means for configuring the means for processing to custom-define (or user-define) the action.

In an embodiment, the means for configuring is the API 520. In an embodiment, the API 520 is a specific configured instance of components illustrated in the FIGS. 1 and 2 using an API provided with OvS, DPDK, OpenStack, OpenDaylight, and/or virtio.

In an embodiment, the means for configuring also provides a means for configuring the means for matching. In an embodiment, the API 520 is the means for configuring and permits tables of files to be established for action in the match-action table/file 521.

Additional Notes & Examples

Example 1 includes subject matter (such as a control device, interplane control device, control plane processor, computer device and or any other electrical apparatus, device or processor) including a memory and processing circuitry. The processing circuitry configured to match an action reference from a table to a portion of data in a network data packet. The processing circuitry further configured to process an action identified by the action reference in cooperation with the memory that accelerates a packet-processing pipeline for the network data packet.

In Example 2, the subject matter of Example 1 can optionally include wherein when the processing circuitry processes the action, the processing circuitry is further configured to perform a Ternary CAM lookup on the portion of data and insert results from the lookup into the network packet as a pre-classification of the network data packet.

In Example 3, the subject matter of any of Examples 1-2 can optionally include wherein when the processing circuitry processes the action, the processing circuitry is further configured to decapsulate an outer tunnel encapsulated header of the network data packet, remove the tunnel encapsulated header from the network data packet, and add metadata into a header for the network data packet that indicates the tunnel encapsulated header was removed from the network data packet.

In Example 4, the subject matter of any of Examples 1-3 can optionally include wherein when the processing circuitry processes the action, the processing circuitry is further configured to copy a packet payload from the network data packet and send the copied packet payload to a location independent of locations that process the packet processing pipeline.

In Example 5, the subject matter of Examples 1~4 can optionally include wherein when the processing circuitry processes the action, the processing circuitry is further configured to copy data packet forwarding rules from a first virtual switch to a second virtual switch.

In Example 6, the subject matter of any of Examples 1-5 can optionally include wherein the processing circuitry is a physical function integrated into the control device.

In Example 7, the subject matter of any of Examples 1-5 can optionally include wherein the processing circuitry is a virtualized function programmed into the control device.

In Example 8, the subject matter of any of Examples 1-7 can optionally include a data plane interface configured to forward the network data packet to one of: an OS kernel stack, a virtualized switch, and a device driver.

In Example 9, the subject matter of any of Examples 1-8 can optionally include wherein the control device is a network interface controller (NIC).

In Example 10, the subject matter of any of Examples 1-9 can optionally include wherein the control device is interfaced and integrated into a multi-core hardware server.

Example 11 includes subject matter such as a machine-readable medium including instructions that, when executed on a machine (such as a control device, interplane control device, control plane processor, computing device, NIC card, etc.) cause the machine to match a portion of a network data packet to an action in a match action table and accelerate processing of the network data packet through the machine by executing the action as part of a packet processing pipeline for the network data packet.

In Example 12, the subject matter of Example 11 may optionally include wherein the instructions to accelerate further include insert metadata into the network data packet indicating that a portion of the packet-processing pipeline was processed when the action was processed.

In Example 13, the subject matter of any of Examples 11-12 may optionally include wherein the instructions to accelerate further include instructions to copy a packet frame for the network data packet and send the copied packet frame to a location that is independent of locations associated with the packet-processing pipeline.

In Example 14, the subject matter of any of Examples 11-13 may optionally include wherein the instructions to accelerate further include instructions to assign the network data packet to a queue associated with a specific processing core of the machine.

In Example 15, the subject matter of Example 14 may optionally include wherein the instructions to accelerate further include instructions to filter the network data packet responsive to filtering rules.

In Example 16, the subject matter of Example 15 may optionally include wherein the instructions to accelerate further include instructions to set a resource identifier on the network data packet that identifies a resource for processing against the network data packet when processing the network data packet through the packet-processing pipeline.

Example 17 include a system (e.g., a server, computer, set of cooperating computers, etc.) a means for matching a portion of a network packet to an action and a means for processing the action to accelerate a packet-processing pipeline associated with the network packet based on processing the action.

Example 18 includes the subject matter of Example 17, and optionally wherein the network packet is sent from a first Virtual Machine (VM) to a second VM, and each of the VMs executing on a same multi-core server that executes the means for matching and the means for processing.

Example 19 includes subject matter of any of the Examples 16-17, and optionally further including a means for configuring the means for processing to custom-define the action.

In Example 20, the subject matter of any of the Examples 16-17, and optionally includes wherein the means for processing is one of: a virtualized network switch, a hardware switch, a kernel process, a device driver, and a virtualized interface.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An apparatus usable in association with Ternary Content-Addressable Memory (TCAM) and at least one network, the apparatus being for use in network switch forwarding operations associated with the at least one network, the apparatus comprising:
    packet processing circuitry configurable to implement, when the apparatus is in operation, at least one programmable match-action operation associated with a packet processing pipeline, the at least one programmable match-action operation being to match, based upon match-action table lookup data, at least one action with received packet data, the at least one action to be carried out by the apparatus with respect to at least one portion of at least one packet containing the received packet data, the at least one action being for use in implementation of, at least in part, one or more of the network switch forwarding operations, the at least one action being configurable to comprise:
        packet data classification; and
        tunnel header data decapsulation associated with the received packet data; and
    programmable parser circuitry for use in association with a parse tree, the programmable parser circuitry to recognize header field data of the received packet data for use in the at least one programmable match-action operation;
    wherein:
        the programmable parser circuitry and the programmable packet processing circuitry are programmable, when the apparatus is in the operation, (1) based upon received configuration data and (2) via at least one application programming interface, the received configuration data to be generated based upon programming language instructions that define the match-action table lookup data and header format data of the received packet data;
        the apparatus is programmable to access at least one portion of the match-action table lookup data that is stored in the TCAM for use in the at least one programmable match-action operation; and
        the packet data classification is based, at least in part, upon tunnel header field data classification rules.

2. The apparatus of claim 1, wherein:
    the tunnel header data decapsulation comprises removal of one or more of:
        virtual extensible local area network (VXLAN) header data;
        network virtualization using generic routing extension (NV-GRE) header data;

generic network virtualization encapsulation (GE-NEVE) header data; and/or multiprotocol label switch (MPLS) header data.

3. The apparatus of claim 2, wherein:
the match-action table lookup data comprises the tunnel header field data classification rules.

4. The apparatus of claim 3, wherein:
the apparatus is comprised in a network switch; and
the network switch comprises physical ports.

5. The apparatus of claim 4, wherein:
the match-action table lookup data also comprises access control list data.

6. At least one non-transitory machine-readable medium storing instructions for being executed by an apparatus, the apparatus being usable in association with Ternary Content-Addressable Memory (TCAM) and at least one network, the apparatus being for use in network switch forwarding operations associated with the at least one network, the apparatus comprising packet processing circuitry and programmable parser circuitry, the instructions when executed by the apparatus resulting in the apparatus being configured for performance of operations comprising:
implementing, by the packet processing circuitry, at least one programmable match-action operation associated with a packet processing pipeline, the at least one programmable match-action operation being to match, based upon match-action table lookup data, at least one action with received packet data, the at least one action to be carried out by the apparatus with respect to at least one portion of at least one packet containing the received packet data, the at least one action being for use in implementation of, at least in part, one or more of the network switch forwarding operations, the at least one action being configurable to comprise:
packet data classification; and
tunnel header data decapsulation associated with the received packet data; and
recognizing, by the programmable parser circuitry, header field data of the received packet data for use in the at least one programmable match-action operation, the programmable parser circuitry being for use in association with a parse tree;
wherein:
the programmable parser circuitry and the programmable packet processing circuitry are programmable, when the apparatus is in the operation, (1) based upon received configuration data and (2) via at least one application programming interface, the received configuration data to be generated based upon programming language instructions that define the match-action table lookup data and header format data of the received packet data;
the apparatus is programmable to access at least one portion of the match-action table lookup data that is stored in the TCAM for use in the at least one programmable match-action operation; and
the packet data classification is based, at least in part, upon tunnel header field data classification rules.

7. The at least one non-transitory machine-readable medium of claim 6, wherein:
the tunnel header data decapsulation comprises removal of one or more of:
virtual extensible local area network (VXLAN) header data;
network virtualization using generic routing extension (NV-GRE) header data;
generic network virtualization encapsulation (GE-NEVE) header data; and/or
multiprotocol label switch (MPLS) header data.

8. The at least one non-transitory machine-readable medium of claim 7, wherein:
the match-action table lookup data comprises the tunnel header field data classification rules.

9. The at least one non-transitory machine-readable medium of claim 8, wherein:
the apparatus is comprised in a network switch; and
the network switch comprises physical ports.

10. The at least one non-transitory machine-readable medium of claim 9, wherein:
the match-action table lookup data also comprises access control list data.

11. A method implemented using an apparatus, the apparatus being usable in association with Ternary Content-Addressable Memory (TCAM) and at least one network, the apparatus being for use in network switch forwarding operations associated with the at least one network, the apparatus comprising packet processing circuitry and programmable parser circuitry, the method comprising:
implementing, by the packet processing circuitry, at least one programmable match-action operation associated with a packet processing pipeline, the at least one programmable match-action operation being to match, based upon match-action table lookup data, at least one action with received packet data, the at least one action to be carried out by the apparatus with respect to at least one portion of at least one packet containing the received packet data, the at least one action being for use in implementation of, at least in part, one or more of the network switch forwarding operations, the at least one action being configurable to comprise:
packet data classification; and
tunnel header data decapsulation associated with the received packet data; and
recognizing, by the programmable parser circuitry, header field data of the received packet data for use in the at least one programmable match-action operation, the programmable parser circuitry being for use in association with a parse tree;
wherein:
the programmable parser circuitry and the programmable packet processing circuitry are programmable, when the apparatus is in the operation, (1) based upon received configuration data and (2) via at least one application programming interface, the received configuration data to be generated based upon programming language instructions that define the match-action table lookup data and header format data of the received packet data;
the apparatus is programmable to access at least one portion of the match-action table lookup data that is stored in the TCAM for use in the at least one programmable match-action operation; and
the packet data classification is based, at least in part, upon tunnel header field data classification rules.

12. The method of claim 11, wherein:
the tunnel header data decapsulation comprises removal of one or more of:
virtual extensible local area network (VXLAN) header data;
network virtualization using generic routing extension (NV-GRE) header data;
generic network virtualization encapsulation (GE-NEVE) header data; and/or
multiprotocol label switch (MPLS) header data.

13. The method of claim 12, wherein:
the match-action table lookup data comprises the tunnel header field data classification rules.

14. The method of claim 13, wherein:
the apparatus is comprised in a network switch; and
the network switch comprises physical ports.

15. The method of claim 14, wherein:
the match-action table lookup data also comprises access control list data.

16. Network switch circuitry usable in association with Ternary Content-Addressable Memory (TCAM) and at least one network, the network switch circuitry being for use in network switch forwarding operations associated with the at least one network, the network switch circuitry comprising:
physical ports;
packet processing circuitry configurable to implement, when the network switch circuitry is in operation, at least one programmable match-action operation associated with a packet processing pipeline, the at least one programmable match-action operation being to match, based upon match-action table lookup data, at least one action with received packet data, the at least one action to be carried out by the network switch circuitry with respect to at least one portion of at least one packet containing the received packet data, the at least one action being for use in implementation of, at least in part, one or more of the network switch forwarding operations that are to be carried out using the physical ports, the at least one action being configurable to comprise:
packet data classification; and
tunnel header data decapsulation associated with the received packet data; and
programmable parser circuitry for use in association with a parse tree, the programmable parser circuitry to recognize header field data of the received packet data for use in the at least one programmable match-action operation;
wherein:
the programmable parser circuitry and the programmable packet processing circuitry are programmable, when the network switch circuitry is in the operation, (1) based upon received configuration data and (2) via at least one application programming interface, the received configuration data to be generated based upon programming language instructions that define the match-action table lookup data and header format data of the received packet data;
the network switch circuitry is programmable to access at least one portion of the match-action table lookup data that is stored in the TCAM for use in the at least one programmable match-action operation; and
the packet data classification is based, at least in part, upon tunnel header field data classification rules.

17. The network switch circuitry of claim 16, wherein:
the tunnel header data decapsulation comprises removal of one or more of:
virtual extensible local area network (VXLAN) header data;
network virtualization using generic routing extension (NV-GRE) header data;
generic network virtualization encapsulation (GENEVE) header data; and/or
multiprotocol label switch (MPLS) header data.

18. The network switch circuitry of claim 17, wherein:
the match-action table lookup data comprises the tunnel header field data classification rules.

19. The network switch circuitry of claim 18, wherein:
the match-action table lookup data also comprises access control list data.

* * * * *